United States Patent
Yamamoto et al.

(10) Patent No.: US 7,819,992 B2
(45) Date of Patent: Oct. 26, 2010

(54) COPPER ALLOY WATER SUPPLY MEMBER

(75) Inventors: Masaaki Yamamoto, Osaka (JP); Yoshimasa Hirai, Osaka (JP); Hiroaki Maedono, Osaka (JP); Chizuko Maedono, legal representative, Osaka (JP)

(73) Assignee: Kurimoto, Ltd., Osaka (JP)

( * ) Notice: Subject to any disclaimer, the term of this patent is extended or adjusted under 35 U.S.C. 154(b) by 0 days.

(21) Appl. No.: 11/922,673

(22) PCT Filed: Jun. 20, 2006

(86) PCT No.: PCT/JP2006/312682
§ 371 (c)(1),
(2), (4) Date: Mar. 19, 2008

(87) PCT Pub. No.: WO2006/137557
PCT Pub. Date: Dec. 28, 2006

(65) Prior Publication Data
US 2008/0286142 A1 Nov. 20, 2008

(30) Foreign Application Priority Data
Jun. 21, 2005 (JP) .............................. 2005-180491

(51) Int. Cl.
*C22C 9/04* (2006.01)

(52) U.S. Cl. .................. 148/432; 148/433; 148/434; 148/435; 420/472; 420/473; 420/476

(58) Field of Classification Search ......... 420/472–473, 420/476; 148/432–435
See application file for complete search history.

(56) References Cited

U.S. PATENT DOCUMENTS 5,487,867 A * 1/1996 Singh ......................... 420/471
2007/0243096 A1 10/2007 Kurose et al.

FOREIGN PATENT DOCUMENTS

| JP | 5-279771 | 10/1993 |
| JP | 7-310133 | 11/1995 |
| JP | 08120369 | * 5/1996 |

(Continued)

OTHER PUBLICATIONS

International Search Report issued Jul. 18, 2006 in the International (PCT) Application PCT/JP2006/312682 of which the present application is the U.S. National Stage.

*Primary Examiner*—Sikyin Ip
(74) *Attorney, Agent, or Firm*—Wenderoth, Lind & Ponack, L.L.P.

(57) ABSTRACT

A member for water works is proposed in which the content of lead is limited to a very small values while maintaining its mechanical properties, castability, machinability, pressure resistance, etc. to levels equivalent to those of conventional copper alloys containing lead.

A copper alloy is produced which contains not less than 2.0% by weight and not more than 5.9% by weight of tin, not less than 1.5% by weight and not more than 5.0% by weight of nickel, not less than 5.0% by weight and not more than 12.1% by weight of zinc, not less than 0.4% by weight and not more than 3.3% by weight of bismuth, and not less than 0.009% by weight and not more than 0.15% by weight of phosphorus, the balance being copper and impurities.

6 Claims, 23 Drawing Sheets

| Shape of powder chips | Shape | Decision |
|---|---|---|
| Straight powder chips | | No good |
| Helical powder chips | | |
| Cylindrical powder chips | | |
| Helical powder chips with spiral tip | | Good |
| Broken powder chips | | |
| Sheared powder chips | | |

FOREIGN PATENT DOCUMENTS

| | | |
|---|---|---|
| JP | 2000-336442 | 12/2000 |
| JP | 2001-64742 | 3/2001 |
| JP | 2002-302722 | 10/2002 |
| JP | 2004-52106 | 2/2004 |
| JP | 2004-68096 | 3/2004 |
| WO | 9404712 * | 3/1994 |
| WO | 2004/022804 | 3/2004 |

* cited by examiner (a)

(b)

Example 1

Example 2

Example 3

Example 4

Example 5

Example 6

Example 7

Example 8

Example 9

Example 10

Example 11

Example 12

Example 13

Example 14

Example 15

Example 16

FIG. 4(b)

Example 17
Example 18
Example 19
Example 20
Example 21
Example 22
Example 23
Example 24
Example 25
Example 26
Example 27
Example 28
Example 29
Example 30
Example 31
Example 32

Comparative Example 17

Comparative Example 18

Comparative Example 19

Comparative Example 20

Comparative Example 21

Comparative Example 22

Comparative Example 23

FIG. 5

| Shape of powder chips | Shape | Decision |
|---|---|---|
| Straight powder chips | | No good |
| Helical powder chips | | |
| Cylindrical powder chips | | |
| Helical powder chips with spiral tip | | Good |
| Broken powder chips | | |
| Sheared powder chips | | |

Example1

Example2

Example4

Example5

Example6

Example7

Example9

Example10

Example11

Example12

Example13

Example14

Example15

Example16

Example17

Example18

Example19

Example20

Example21

Example23

Example24

Example25

Example26

Examples27-100

Examples27-200

Examples27-400

Example28

Example29

Example30

Example31

Example32

Example33

Example34

Example35

Example36

Example37

Example38

Example39

Comparative Examples 1-100

Comparative Examples 1-200

Comparative Example 1-400

Comparative Example 2

Comparative Example 3

Comparative Example 4

Comparative Example 6

Comparative Example 7

Comparative Example 9

Comparative Example 10

Comparative Example 11

Comparative Example 12

Comparative Example 13

Comparative Example 14

Comparative Example 15

Comparative Example 16

Comparative Example 17

Comparative Example 18

Comparative Example 19

Example 10

Example 2

Example 13

Example 13 Magnification : 2000 fold

Example 14

Example 7

Example 17

Example 18

Example 19

Example 20

Example 23

Example 23 Magnification : 2000 fold

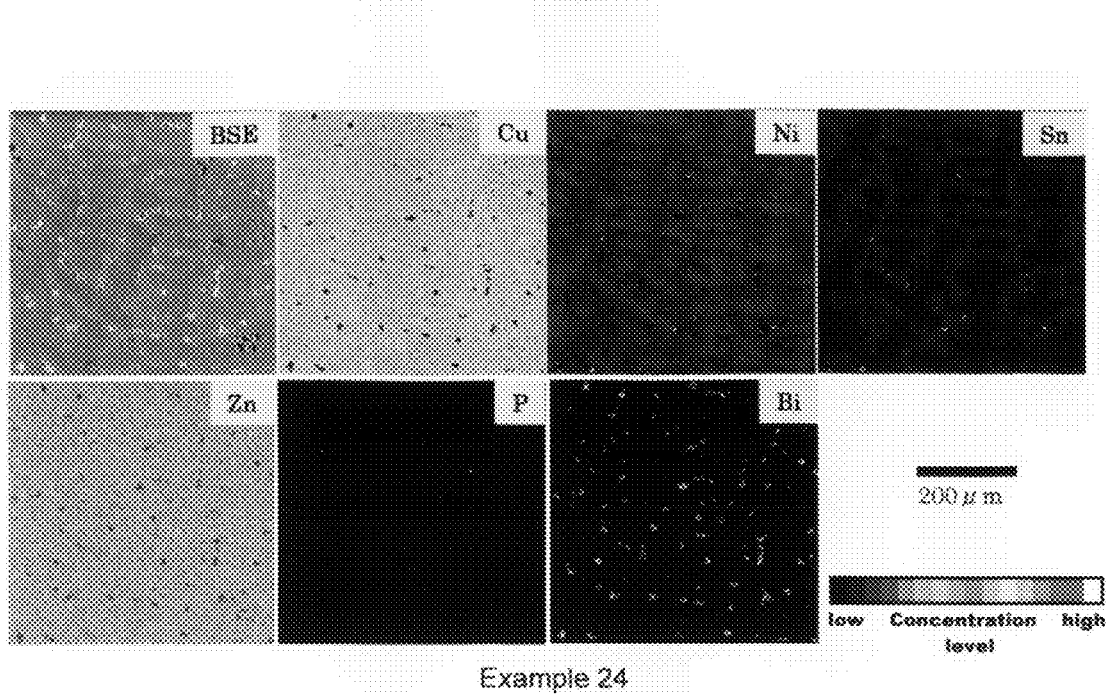

Example 26

Example 26 Magnification : 2000 fold

Example 27

Example 30

COPPER ALLOY WATER SUPPLY MEMBER

TECHNICAL FIELD

This invention relates to a copper alloy material for members used in water works applications which leaches lead by an amount that is lower than a predetermined value.

BACKGROUND ART

Cast copper alloy ingot CAC406, which has heretofore been used for parts of water supply systems and devices, contain 4.0 to 6.0% by weight of lead. Thus, lead in this material tends to dissolve into tap water. In order to reduce the amount of toxic lead that dissolves into tap water, consideration is now being given to developing lead-reduced or lead-free copper alloys.

But such lead-reduced or lead-free copper alloys are difficult to cast and cut, and also tend to be low in pressure resistance. Valves made of such alloys therefore tend to cause water leakage. Alloys are thus being considered that are not only low in lead content, but sufficiently high in pressure resistance and other necessary properties compared to alloys that are higher in lead content.

Among such alloys is one disclosed in Patent document 1, to which bismuth and selenium are added to improve machinability. Patent document 2 discloses an alloy to which silicon and magnesium are added to improve strength and leaching properties.

[Patent document 1] JP Patent publication 2004-68096A
[Patent document 2] JP patent publication 2004-52106A

DISCLOSURE OF THE INVENTION

Object of the Invention

But because selenium also has some toxicities, the use of the alloy disclosed in Patent document 1, which contains selenium, as members for water works may have some harmful effects. An alloy containing silicon develops wool-like silicate, thereby promoting the formation of microporosity, which can in turn reduce the pressure resistance. Magnesium tends to form oxides such as magnesium oxide, which tend to be dispersed in the material, thereby lowing its elongation and considerably impairing its flowability.

On the other hand, in order to answer the global requirement for effective use of resources, efforts are being made to use recycled materials for more effective use of metallic resources. But recycled materials derived from conventional metallic products inevitably contain impurities including lead (though its content may be very small), because lead is generally used in such conventional metallic products. Alloys made of such recycled materials may therefore also inevitably contain trace amounts of lead.

An object of the present invention is therefore to provide a member for water works in which the content of lead and the amounts of metals that dissolve into water are limited to very small values, while maintaining its mechanical properties, castability, machinability, pressure resistance, etc. to levels equivalent to those of conventional copper alloys containing lead.

Means to Achieve the Object

To achieve the above object, the present invention provides a member for water works made of a copper alloy containing not less than 2.0% by weight and not more than 5.9% by weight of tin, not less than 1.5% by weight and not more than 5.0% by weight of nickel, not less than 5.0% by weight and not more than 12.1% by weight of zinc, not less than 0.4% by weight and not more than 3.3% by weight of bismuth, and not less than 0.009% by weight and not more than 0.15% by weight of phosphorus, the balance being copper and impurities.

ADVANTAGES OF THE INVENTION

The lead content of the copper alloy for the member used in water works applications according to the present invention is substantially equal to the content of lead contained as impurities in a recycled material used as a raw material. Thus, it is possible to minimize the amount of lead that dissolves into water. By adding predetermined amounts of tin, nickel, zinc, phosphorus and bismuth, the copper alloy can maintain sufficient castability, mechanical properties, pressure resistance, leaching properties and machinability even though the lead content is low, so that the copper alloy according to the invention can be advantageously used for members used in water works applications.

BRIEF DESCRIPTION OF THE DRAWINGS

In FIG. 4(b), photos of sections of each stepped specimen show results of a liquid penetrant testing.

FIG. 5 is a table showing a decision method according to the shapes of powder chips in a test for machinability.

In FIG. 7(g), photos show the results of mapping analysis by EPMA.

BEST MODE FOR EMBODYING THE INVENTION

Figure 1:
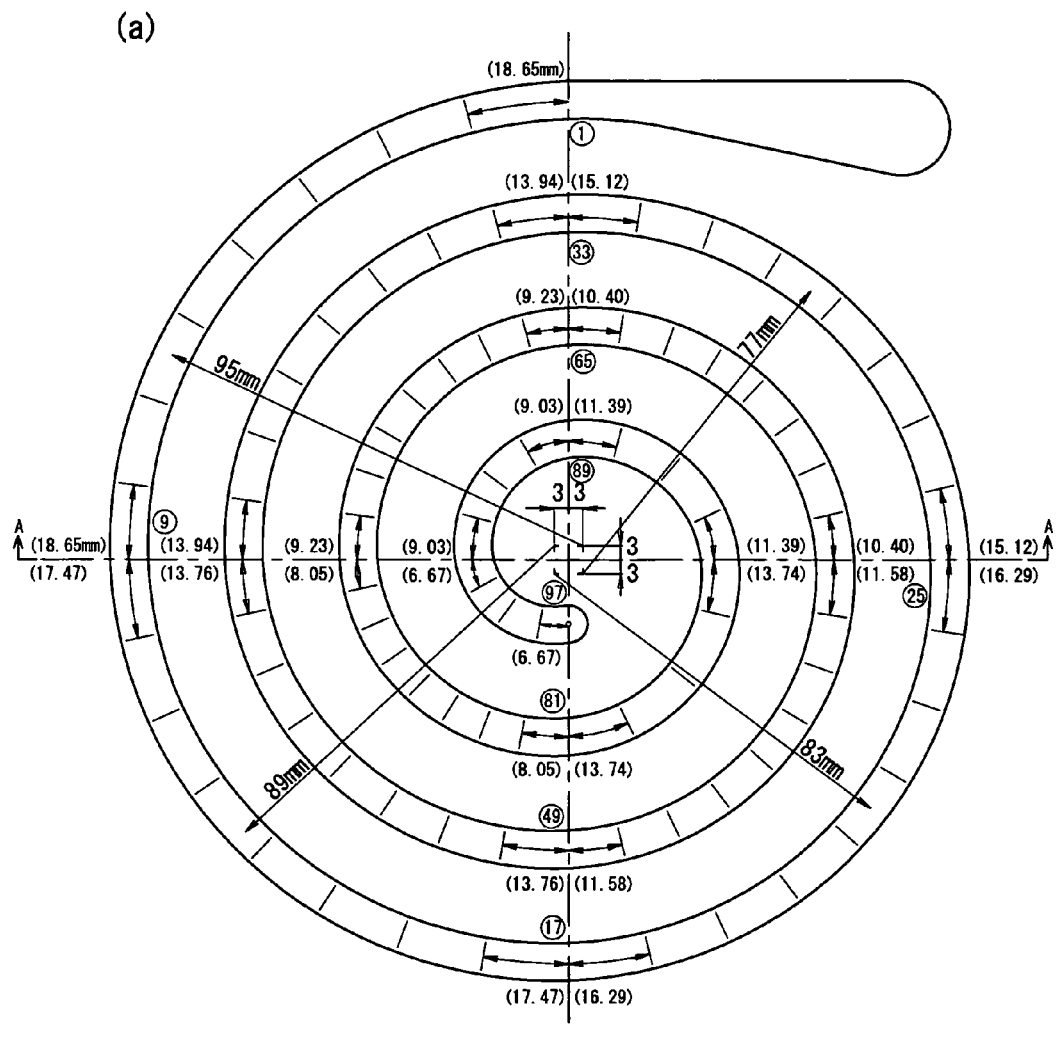
FIG. 1(a) shows the shape of a spiral frame used in a test for flowability of molten metal for examples.
FIG. 1(b) is a sectional view taken along line A-A, of the spiral frame shown in FIG. 1(a).
Figure 1:
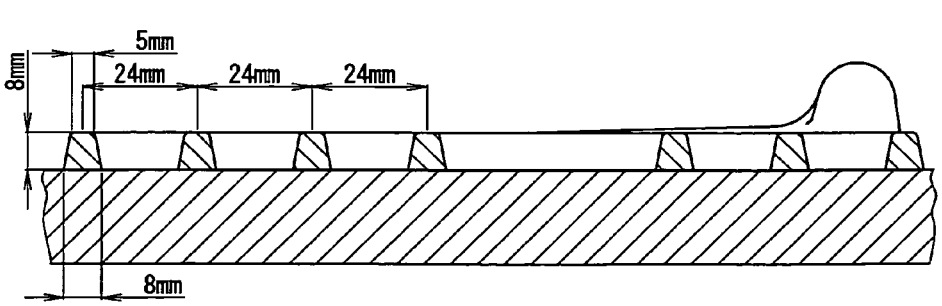

The present invention is now described in detail.

This invention is directed to a copper alloy member for use in water works applications made of a copper alloy containing predetermined amounts of tin, nickel, zinc, bismuth and phosphorus, the balance being copper and impurities. The contents of lead and silicon contained in the impurities are lower than predetermined values. Description is first made of the respective elements forming the copper alloy for the member for water works according to the present invention.

It is essential that this copper alloy contains tin by not less than 2.0% by weight. Preferably, the tin content is not less than 2.4% by weight. The higher the tin content, the higher the tensile strength of the copper alloy, and the lower the elongation. Thus, if the tin content is less than 2.0% by weight, it may be difficult to obtain stable tensile strength. On the other hand, the tin content has to be not more than 5.9% by weight. Preferably, the tin content is not less than 5.2% by weight. If the tin content is higher than 5.9% by weight, the elongation of the copper alloy may be too low. As used herein, the mechanical properties refer to tensile strength and elongation. Here, good mechanical properties mean a high tensile strength and a high elongation.

The content of nickel in the copper alloy has to be not less than 1.5% by weight, and is preferably not less than 2.0% by weight. If the nickel content is less than 1.5% by weight, the copper alloy tends to develop casting defects and microporosity, which may in turn cause an unignorable increase in leaching of one or some elements. On the other hand, the nickel content has to be not more than 5.0% by weight and is preferably not more than 4.1% by weight. If the nickel content is higher than 5.0% by weight, the elongation will be too low. Because nickel shows a complete solubility in the solid state in copper as the main component, and its crystalline structure comprises a face-centered cubic lattice as with copper, nickel is a suitable element as one of the two substrate bases. Also, nickel serves to effectively reduce the tin concentration of the liquid phase at the solid-liquid interface during solidification, thus preventing segregation, and reducing casting defects, thereby improving pressure resistance. Nickel further forms compounds with tin and phosphorus in dendrite gaps, thereby filling microporosity. The compounds also serve as chip breakers to break chips into finely sheared powder.

The content of zinc in the copper alloy has to be not less than 5.0% by weight, and is preferably not less than 6.0% by weight. Also, the zinc content has to be not more than 12.1% by weight, and is preferably not more than 10.1% by weight. Zinc has a deoxidizing function, improves flowability of molten metal, and stabilizes the mechanical properties. By adding zinc by an amount between the abovementioned upper and lower limits, the strength of the copper alloy is substantially unchanged, so that zinc has no substantial influence on the mechanical properties. But if the zinc content is less than 5.0% by weight, flowability of the copper alloy in a molten state tends to be insufficient, and also, the copper alloy may develop microporosity. On the other hand, if the zinc content is higher than 12.1% by weight, the elongation will unignorably decrease. Also, during manufacturing, zinc skim may increase casting defects. Further, if the leaching of zinc exceeds a reference leaching value of zinc, the possibility of dezincification corrosion increases, and also, it becomes impossible to use such a copper alloy as a member for water works.

The content of bismuth in the copper alloy has to be not less than 0.4% by weight and also has to be not more than 3.3% by weight. The bismuth content is preferably not more than 2.0% by weight. Since bismuth is not soluble in a solid state in a matrix in a practical range and is present at grain boundaries and in crystal grains, it prevents development of casting defects in a solid state, which are peculiar to bronze castings. Also, bismuth in the alloy improves machinability. If the bismuth content is less than 0.4% by weight, these effects may not be obtained sufficiently. On the other hand, with an increase in the bismuth content, the elongation tends to decrease, though the tensile strength does not decrease. Therefore, if the bismuth content is higher than 2.0% by weight, the elongation tends to be low, so that the microporosity tends to develop. If the bismuth content exceeds 3.3% by weight, the elongation decreases to such an extent that the development of microporosity is unignorable.

If the tin content is not less than 5.1% by weight and not more than 5.2% by weight, even if the bismuth content is higher than 2.0% by weight, reduction in elongation and development of microporosity are relatively suppressed. But if the tin content is lower than the above range, these weak points tend to appear. Thus, in order to suppress these weak points with the tin content within the range of not less than 2.0% by weight and not more than 6.0% by weight, the bismuth content is preferably in the range of not less than 0.4% by weight and not more than 2.0% by weight.

The content of phosphorus in the copper alloy has to be not less than 0.009% by weight, and is preferably not less than 0.014% by weight. On the other hand, the phosphorus content has to be not more than 0.15% by weight, and is preferably not more than 0.10% by weight. Phosphorus acts as a deoxidizing agent during melting and casting, thereby improving flowability of molten metal during casting, and also improving healthiness of castings. If its content is less than 0.009% by weight, these effects are not obtained sufficiently, so that casting defects tend to develop. If its content is higher than 0.15% by weight, phosphorus tends to react with water in the mold, thereby increasing the possibility of casting defects.

In the alloy according to the present invention, the area ratio of nickel-tin and nickel-phosphorus compounds to the section of the material is preferably not less than 0.04%. If this area ratio is less than 0.04%, these compounds may not sufficiently fill gaps around these compounds which fill microporosity. On the other hand, this area ratio is preferably not more than 1.95%. If this area ratio is higher than 1.95%, the nickel compounds not only fill gaps, the physical properties of the nickel compound itself may have unignorable influences on the entire alloy.

The sum of the area ratios of bismuth and the above nickel compounds that appear on a section of the alloy is preferably not less than 0.72%. If this value is less than 0.72%, microporosity may not be filled sufficiently. On the other hand, this value is preferably not more than 5.95%. If this value is over 5.95%, the physical properties of these substances will have unignorable influences on the entire alloy.

The copper alloy may contain impurities other than the abovementioned substances and copper. Such impurities are substances that are inevitably contained in the copper alloy if e.g. recycled materials are used in producing the copper alloy for environmental consciousness. The content of such impurities should of course be as low as possible. The impurities include e.g. lead and silicon.

The content of lead in the copper alloy is preferably not more than 0.2% by weight, and should be as low as possible within the range of not more than 0.2% by weight. Lead has a large evil influence on the human body. Thus, in using the copper alloy for the member for water works according to this invention, it is necessary to minimize the amount of lead that dissolves into tap water. If this amount is higher than 0.2% by weight, it is difficult to meet the leaching standard value by the leaching test method under JWWA Z 108. Also, if the lead content is too large, the tensile strength and elongation may decrease excessively, or casting defects may develop. The lead content is, most ideally, zero. But as long as the copper alloy is made of recycled materials for efficient use of resources, it is not practical to reduce the lead content to zero.

The content of silicon in the copper alloy is preferably less than 0.01% by weight. While silicon serves to improve flowability of the copper alloy in a molten state, it develops wool-like silicon oxide when solidifying, thereby making it difficult to replenish molten metals and also increases the concentration of tin in the liquid phase at the solid-liquid interface. This helps the development of many microscopic casting defects between dendrites or at grain boundaries, which in turn results in water leakage. Silicon also considerably reduces the elongation of the copper alloy. If the silicon content is higher than 0.01% by weight, these detrimental effects tend to be unignorable. Thus, the silicon content should be as low as possible. But by limiting the silicon content to less than 0.01% by weight, these detrimental effects scarcely appear.

The abovementioned contents in weight of the respective substances are not the contents at the production stage, but the contents of the respective substances in the alloy obtained by melting the respective substances.

Ordinarily, since bronze castings have a wide solidifying temperature range, they solidify in the mushy type. Bronze castings that do not contain lead tend to develop microscopic shrinkage cavities between dendrites. This lowers the pressure resistance of members for water works that are made of such materials, thereby increasing the possibility of water leakage. Especially if such a member has a thick wall, this tendency is prominent due to a slow cooling speed during casting. On the other hand, in the case of a copper alloy containing a large amount of lead, lead collects between dendrites, thus reducing microporosity. According to the present invention, bismuth and nickel-tin and nickel-phosphorus compounds in the copper alloy play this role of lead. By adding predetermined amounts of nickel and bismuth, it is possible to reduce fine microporosity that tends to develop in the central portion with respect to the wall thickness direction. By adding a predetermined amount of phosphorus, phosphorus reacts with oxygen in the molten metal, which can cause gas defects, forming $P_2O_5$, thereby improving the soundness of the molten metal, and reducing microporosity. But if the silicon content is too high, casting defects tend to increase to such an extent as not to be curable by adding e.g. nickel.

The balance of this copper alloy is copper. The alloy containing the abovementioned elements can be produced by a method for producing ordinary copper alloys. The copper alloy member for water works made of this copper alloy can be manufactured by an ordinary casting method. For example, it can be manufactured by melting the alloy in a high-frequency induction furnace.

The copper alloy member for water works according to the present invention is made of an copper alloy that contains lead only in an amount substantially equal to the amount of impurities, and is characterized by good flowability of molten metal, high mechanical properties, fewer casting defects, high leaching properties and machinability, etc., compared to copper alloys containing larger amounts of lead. Thus, the member for water works made of this copper alloy is low in leaching amount of lead, and high in machinability, pressure resistance, etc.

Specifically, when compared with conventional CAC406 alloy, the machinability coefficient of the copper alloy according to the invention is at least 70 or higher. This value can be further increased according to the mixture ratio of the substances.

The machinability coefficient was calculated from three stress values that act on a cutting tool, i.e. circumferential force P1, force P2 in the feed direction and force P3 in the axial direction of the tool, which were measured by a dynamometer AST-TTH for type AST cutting tools made by Sato Kogyo Co., Ltd., and three stress values measured in the same manner for Comparative Material CAC406, according to the below equation (1). The "Resultant of three forces" in equation (1) is calculated according to equation (2) below.

$$\text{(Machinability coefficient)}=\text{(Resultant of three forces for Comparative Material)}/\text{(Resultant of three forces for each material)}\times 100 \quad (1)$$

$$\text{(Resultant of three forces)}=\{(\text{Circumferential force})^2+(\text{Force in the feed direction})^2+(\text{Force in the axial direction})^2\}^{1/2} \quad (2)$$

In examples of the invention, when the cutting speed was 100 to 400 m/min., the depth of cut was 1.0 mm, and the feed rate was 0.1 mm/rev., the surface roughness was 0.6 to 1.1 μm. Under the same conditions, the surface roughness of CAC406 was 0.8 to 1.0 μm. Thus the surface roughness values are substantially equal to each other. The smaller the surface roughness value becomes, the smoother the surface becomes. Thus, the surface roughness value should be as small as possible.

Besides satisfying these values, chips are in the shape of spirals, broken powders, or sheared chips. Thus, no straight, helical or tubular chips are produced.

The flowability of the molten copper alloy according to the present invention is preferably such that it is equivalent to or higher than the flowability of conventional lead-containing copper alloys when the casting temperature is higher than the conventional temperature within the ordinary temperature range. More preferably, its flowability is equivalent or higher than the flowability of conventional lead-containing copper alloys at the same temperature as the conventional temperature. The casting temperature at which such flowability is achieved is preferably in the range of 1100 to 1200° C.

For the mechanical properties of the copper alloy according to this invention, the tensile strength and the elongation as measured under JIS Z 2241 are preferably equivalent or higher than those of CAC406 as a conventional lead-containing copper alloy. Specifically, the tensile strength is preferably not less than 195 MPa, and the elongation is preferably not less than 15%.

For casting defects, in a liquid penetrant testing under JIS Z 2343, no pattern indicative of defects appeared in the central portion in the wall thickness direction. Thus, production can be made by the same casting method as used for the conventional lead-containing copper alloy CAC406.

For the leaching properties or the like, too, in a leaching test method under JWWA Z 108 and in a leaching analysis method under JWWA Z 110, the lead concentration was not more than 0.1 mg/l, the zinc concentration was not more than 10 mg/l, the copper concentration was not more than 0.1 mg/l, and the cadmium concentration was not more than 0.001 mg/l. These values all satisfy the required standard values. Also, the lead concentration and the cadmium concentration are lower than 0.38 mg/l and 0.0004 mg/l, which are leaching amounts of lead and cadmium from CAC406, respectively. The copper alloy according to this invention is thus safer than conventional lead-containing copper alloys.

Copper alloy members for water works that are made of the copper alloy according to the present invention include water supply parts and instruments used in water supply facilities and devices, and other parts and instruments in which the use of lead is not desirable. Specifically, such members include pipes, valve bodies and bearings used in such valves as gate valves, repair valves, check valves, ball valves, solenoid valves, water stop valves, saddle valves and draft tube valves, case bodies of water meters, pipe couplings, faucet fittings and pump parts.

EXAMPLES

Examples are now shown to more specifically describe the invention. Respective materials were mixed together, and the mixtures were melted in a high-frequency induction furnace and cast in a $CO_2$ die to prepare test specimens for the respective examples. Comparative Example 1 was prepared using as a reference material a conventional lead-containing bronze material CAC406 to compare physical properties. These prepared copper alloys were subjected to the below-described tests.

TABLE 1

| | Comparative Example 2 | Example 1 of the invention | Example 2 of the invention | Example 3 of the invention | Example 4 of the invention | Example 5 of the invention | Comparative Example 1 |
|---|---|---|---|---|---|---|---|
| Element | | | | | | | |
| Ni | 2.5 | 2.5 | 2.5 | 2.5 | 2.5 | 2.6 | 0.2 |
| Sn | 2.5 | 2.7 | 2.7 | 2.5 | 2.6 | 2.4 | 5.8 |
| Zn | 4.1 | 5.1 | 6.0 | 8.4 | 10.1 | 12.1 | 5.1 |
| Bi | 0.5 | 0.6 | 0.6 | 0.6 | 0.5 | 0.5 | — |
| P | 0.017 | 0.022 | 0.017 | 0.019 | 0.015 | 0.023 | 0.021 |
| Si | <0.01 | <0.01 | <0.01 | <0.01 | <0.01 | <0.01 | — |
| Pb | <0.001 | <0.001 | <0.001 | <0.001 | <0.001 | <0.001 | 5.4 |
| Cu | Balance | Balance | Balance | Balance | Balance | Balance | Balance |
| Flowability of molten metal | X | Δ | Δ | Δ | ○ | ○ | Reference |
| Mechanical properties | ○ | ○ | ○ | ○ | ○ | ○ | |
| Tensile strength | 274 | 246 | 259 | 253 | 248 | 232 | ≧195 |
| Elongation | 34.8 | 27.8 | 31.2 | 33.9 | 34.7 | 31.1 | ≧15 |
| Liquid penetrant testing | X | Δ | ○ | ○ | ○ | ○ | Reference |
| Leaching | ○ | ○ | ○ | ○ | ○ | ○ | X |
| Machinability coefficient | 71.2 | 77.9 | 72.7 | — | 80.8 | 81.3 | 100 |
| Surface roughness | 0.8 | 0.8 | 0.8 | — | 0.9 | 1.0 | 0.8 |
| Shape of chips | ○ | ○ | ○ | — | ○ | ○ | ○ |
| Evaluation of Machinability | ○ | ○ | ○ | — | ○ | ○ | Reference |
| General | X | Δ | Δ | Δ | ○ | ○ | |

| | Comparative Example 3 | Example 6 of the invention | Example 7 of the invention | Example 8 of the invention | Example 9 of the invention | Comparative Example 4 |
|---|---|---|---|---|---|---|
| Element | | | | | | |
| Ni | 2.5 | 2.5 | 2.5 | 2.5 | 2.5 | 2.5 |
| Sn | 5.0 | 5.4 | 5.2 | 5.2 | 5.1 | 5.3 |
| Zn | 3.9 | 5.0 | 6.0 | 8.1 | 9.7 | 12.4 |
| Bi | 0.5 | 0.5 | 0.6 | 0.6 | 0.5 | 0.5 |
| P | 0.016 | 0.021 | 0.015 | 0.022 | 0.020 | 0.027 |
| Si | <0.01 | <0.01 | <0.01 | <0.01 | <0.01 | <0.01 |
| Pb | <0.001 | <0.001 | <0.001 | <0.001 | <0.001 | <0.001 |
| Cu | Balance | Balance | Balance | Balance | Balance | Balance |
| Flowability of molten metal | X | Δ | Δ | ○ | ○ | ○ |
| Mechanical properties | ○ | ○ | ○ | ○ | ○ | X |

TABLE 1-continued

| | | | | | | |
|---|---|---|---|---|---|---|
| Tensile strength | 289 | 293 | 273 | 273 | 251 | 207 |
| Elongation | 32.9 | 31.4 | 26.8 | 28.0 | 24.1 | 14.1 |
| Liquid penetrant testing | X | Δ | Δ | Δ | Δ | ○ |
| Leaching | ○ | ○ | ○ | ○ | ○ | ○ |
| Machinability coefficient | 73.5 | 75.2 | 76.7 | — | 79.1 | 78.5 |
| Surface roughness | 0.9 | 0.9 | 0.9 | — | 1.1 | 0.9 |
| Shape of chips | ○ | ○ | ○ | — | ○ | ○ |
| Evaluation of Machinability | ○ | ○ | ○ | — | ○ | ○ |
| General | X | Δ | Δ | Δ | Δ | X |

TABLE 2

| | Comparative Example 5 | Comparative Example 6 | Example 10 of the invention | Example 11 of the invention | Example 2 of the invention | Example 12 of the invention | Example 13 of the invention | Comparative Example 7 |
|---|---|---|---|---|---|---|---|---|
| Element | | | | | | | | |
| Ni | 0.0 | 1.0 | 1.5 | 2.0 | 2.5 | 4.1 | 5.0 | 6.0 |
| Sn | 2.6 | 2.6 | 2.7 | 2.3 | 2.7 | 2.4 | 2.4 | 2.4 |
| Zn | 6.0 | 6.0 | 6.9 | 6.8 | 6.0 | 7.1 | 7.2 | 7.3 |
| Bi | 0.5 | 0.5 | 0.5 | 0.4 | 0.6 | 0.5 | 0.5 | 0.5 |
| P | 0.006 | 0.007 | 0.020 | 0.016 | 0.017 | 0.019 | 0.016 | 0.025 |
| Si | <0.01 | <0.01 | <0.01 | <0.01 | <0.01 | <0.01 | <0.01 | <0.01 |
| Pb | <0.001 | <0.001 | <0.001 | <0.001 | <0.001 | <0.001 | <0.001 | <0.001 |
| Cu | Balance | Balance | Balance | Balance | Balance | Balance | Balance | Balance |
| Flowability of molten metal | Δ | Δ | Δ | Δ | Δ | Δ | Δ | Δ |
| Mechanical properties | ○ | ○ | ○ | ○ | ○ | ○ | ○ | X |
| Tensile strength | 215 | 249 | 257 | 232 | 259 | 247 | 221 | 214 |
| Elongation | 21.3 | 28.4 | 46.2 | 21.7 | 31.2 | 19.3 | 16.9 | 14.3 |
| Liquid penetrant testing | X | X | Δ | Δ | ○ | Δ | Δ | X |
| Leaching | X | X | ○ | ○ | ○ | ○ | ○ | X |
| Machinability coefficient | — | 86.4 | 83.1 | 81.6 | 72.7 | 73.1 | 74.9 | 80.2 |
| Surface roughness | — | 0.9 | 0.8 | 0.8 | 1.0 | 1.0 | 1.0 | 0.9 |
| Shape of chips | — | ○ | ○ | ○ | ○ | ○ | ○ | ○ |
| Evaluation of Machinability | — | ○ | ○ | ○ | ○ | ○ | ○ | ○ |
| General | X | X | Δ | Δ | Δ | Δ | Δ | X |

| | Comparative Example 8 | Comparative Example 9 | Example 14 of the invention | Example 15 of the invention | Example 7 of the invention | Example 16 of the invention | Example 17 of the invention | Comparative Example 10 |
|---|---|---|---|---|---|---|---|---|
| Element | | | | | | | | |
| Ni | 0.0 | 1.0 | 1.5 | 2.0 | 2.5 | 4.1 | 5.0 | 5.9 |
| Sn | 4.9 | 4.9 | 4.8 | 4.8 | 5.2 | 4.7 | 5.4 | 5.0 |
| Zn | 6.1 | 5.9 | 7.1 | 7.2 | 6.0 | 7.1 | 7.2 | 7.0 |
| Bi | 0.5 | 0.5 | 0.5 | 0.5 | 0.6 | 0.5 | 0.5 | 0.5 |
| P | 0.009 | 0.007 | 0.023 | 0.017 | 0.015 | 0.020 | 0.022 | 0.024 |
| Si | <0.01 | <0.01 | <0.01 | <0.01 | <0.01 | <0.01 | <0.01 | <0.01 |
| Pb | <0.001 | <0.001 | <0.001 | <0.001 | <0.001 | <0.001 | <0.001 | <0.001 |
| Cu | Balance | Balance | Balance | Balance | Balance | Balance | Balance | Balance |
| Flowability of molten metal | Δ | Δ | Δ | ○ | Δ | Δ | ○ | Δ |
| Mechanical properties | ○ | ○ | ○ | ○ | ○ | ○ | ○ | X |
| Tensile strength | 270 | 274 | 233 | 259 | 273 | 278 | 288 | 269 |
| Elongation | 45.3 | 36.5 | 20.8 | 27.1 | 26.8 | 22.5 | 20.8 | 13.5 |

TABLE 2-continued

| | | | | | | | | |
|---|---|---|---|---|---|---|---|---|
| Liquid penetrant testing | X | X | ◯ | ◯ | Δ | ◯ | ◯ | Δ |
| Leaching | X | ◯ | ◯ | ◯ | ◯ | ◯ | ◯ | ◯ |
| Machinability coefficient | — | 85.2 | 83.1 | 75.7 | 76.7 | 71.8 | 75.3 | 66.6 |
| Surface roughness | — | 1.0 | 0.9 | 0.9 | 0.9 | 0.9 | 0.9 | 0.9 |
| Shape of chips | — | ◯ | ◯ | ◯ | ◯ | ◯ | ◯ | X |
| Evaluation of Machinability | — | ◯ | ◯ | ◯ | ◯ | ◯ | ◯ | X |
| General | X | X | ◯ | ◯ | Δ | Δ | ◯ | X |

TABLE 3

| | Comparative Example 11 | Example 18 of the invention | Example 2 of the invention | Example 19 of the invention | Example 7 of the invention | Example 20 of the invention | Comparative Example 12 |
|---|---|---|---|---|---|---|---|
| Element | | | | | | | |
| Ni | 2.5 | 2.5 | 2.5 | 2.5 | 2.5 | 2.5 | 2.5 |
| Sn | 1.0 | 2.0 | 2.7 | 3.9 | 5.2 | 5.9 | 8.4 |
| Zn | 7.1 | 7.2 | 6.0 | 7.1 | 6.0 | 7.2 | 8.2 |
| Bi | 0.6 | 0.5 | 0.6 | 0.5 | 0.6 | 0.5 | 0.6 |
| P | 0.021 | 0.023 | 0.017 | 0.020 | 0.015 | 0.019 | 0.019 |
| Si | <0.01 | <0.01 | <0.01 | <0.01 | <0.01 | <0.01 | <0.01 |
| Pb | <0.001 | <0.001 | <0.001 | <0.001 | <0.001 | <0.001 | <0.001 |
| Cu | Balance | Balance | Balance | Balance | Balance | Balance | Balance |
| Flowability of molten metal | Δ | Δ | Δ | Δ | Δ | Δ | ◯ |
| Mechanical properties | ◯ | ◯ | ◯ | ◯ | ◯ | ◯ | X |
| Tensile strength | 230 | 252 | 259 | 264 | 273 | 267 | 253 |
| Elongation | 44.2 | 31.0 | 31.2 | 32.9 | 26.8 | 20.7 | 12.4 |
| Liquid penetrant testing | X | ◯ | ◯ | ◯ | Δ | ◯ | ◯ |
| Leaching | ◯ | ◯ | ◯ | ◯ | ◯ | ◯ | ◯ |
| Machinability coefficient | 85.8 | 82.5 | 72.7 | 80.8 | 76.7 | 80.9 | 80.0 |
| Surface roughness | 1.0 | 0.9 | 0.8 | 1.0 | 0.9 | 0.8 | 0.8 |
| Shape of chips | ◯ | ◯ | ◯ | ◯ | ◯ | ◯ | ◯ |
| Evaluation of Machinability | ◯ | ◯ | ◯ | ◯ | ◯ | ◯ | ◯ |
| General | X | Δ | Δ | Δ | Δ | Δ | X |

TABLE 4

| | Comparative Example 13 | Example 2 of the invention | Example 21 of the invention | Example 22 of the invention | Example 23 of the invention | Example 24 of the invention | Comparative Example 14 |
|---|---|---|---|---|---|---|---|
| Element | | | | | | | |
| Ni | 2.5 | 2.5 | 2.5 | 2.5 | 2.5 | 2.5 | 2.5 |
| Sn | 2.6 | 2.7 | 2.4 | 2.6 | 2.6 | 2.5 | 2.4 |
| Zn | 7.3 | 6.0 | 7.0 | 7.2 | 6.2 | 7.2 | 7.3 |
| Bi | 0.0 | 0.6 | 1.0 | 1.3 | 1.7 | 2.0 | 2.4 |
| P | 0.020 | 0.017 | 0.018 | 0.024 | 0.021 | 0.023 | 0.016 |
| Si | <0.01 | <0.01 | <0.01 | <0.01 | <0.01 | <0.01 | <0.01 |
| Pb | <0.001 | <0.001 | <0.001 | <0.001 | <0.001 | <0.001 | <0.001 |
| Cu | Balance | Balance | Balance | Balance | Balance | Balance | Balance |
| Flowability of molten metal | Δ | Δ | Δ | ◯ | ◯ | Δ | X |
| Mechanical properties | ◯ | ◯ | ◯ | ◯ | ◯ | ◯ | X |
| Tensile strength | 263 | 259 | 240 | 248 | 241 | 219 | 176 |

TABLE 4-continued

|  | | | | | | | |
|---|---|---|---|---|---|---|---|
| Elongation | 40.6 | 31.2 | 24.2 | 22.7 | 20.8 | 17.8 | 11.4 |
| Liquid penetrant testing | X | ○ | ○ | ○ | ○ | ○ | X |
| Leaching | X | ○ | ○ | ○ | ○ | ○ | X |
| Machinability coefficient | 61.1 | 72.7 | 85.9 | — | 84.2 | 91.3 | 86.1 |
| Surface roughness | 1.0 | 0.8 | 0.8 | — | 1.0 | 0.9 | 0.8 |
| Shape of chips | X | ○ | ○ | — | ○ | ○ | ○ |
| Evaluation of Machinability | X | ○ | ○ | — | ○ | ○ | ○ |
| General | X | Δ | Δ | ○ | ○ | ○ | X |

|  | Comparative Example 15 | Example 7 of the invention | Example 25 of the invention | Example 26 of the invention | Comparative Example 16 |
|---|---|---|---|---|---|
| Element | | | | | |
| Ni | 2.5 | 2.5 | 2.5 | 2.5 | 2.5 |
| Sn | 5.2 | 5.2 | 5.1 | 5.1 | 4.8 |
| Zn | 7.2 | 6.0 | 6.1 | 6.1 | 7.2 |
| Bi | 0.0 | 0.6 | 1.6 | 3.3 | 3.9 |
| P | 0.010 | 0.015 | 0.019 | 0.021 | 0.013 |
| Si | <0.01 | <0.01 | <0.01 | <0.01 | <0.01 |
| Pb | <0.001 | <0.001 | <0.001 | <0.001 | <0.001 |
| Cu | Balance | Balance | Balance | Balance | Balance |
| Flowability of molten metal | X | Δ | ○ | ○ | ○ |
| Mechanical properties | ○ | ○ | ○ | ○ | X |
| Tensile strength | 298 | 273 | 270 | 237 | 189 |
| Elongation | 47.4 | 26.8 | 24.1 | 16.6 | 8.8 |
| Liquid penetrant testing | Δ | Δ | ○ | ○ | X |
| Leaching | ○ | ○ | ○ | ○ | ○ |
| Machinability coefficient | 61.8 | 76.7 | 86.7 | 90.2 | 96.9 |
| Surface roughness | 0.9 | 0.9 | 0.9 | 1.0 | 0.9 |
| Shape of chips | X | ○ | ○ | ○ | ○ |
| Evaluation of Machinability | X | ○ | ○ | ○ | ○ |
| General | X | Δ | ○ | ○ | X |

TABLE 5

|  | Comparative Example 17 | Example 2 of the invention | Example 27 of the invention | Example 28 of the invention | Example 29 of the invention | Example 30 of the invention |
|---|---|---|---|---|---|---|
| Element | | | | | | |
| Ni | 2.5 | 2.5 | 2.7 | 2.5 | 2.5 | 2.5 |
| Sn | 2.6 | 2.7 | 2.7 | 2.6 | 2.6 | 2.5 |
| Zn | 7.2 | 6.0 | 7.8 | 7.1 | 7.2 | 7.3 |
| Bi | 0.5 | 0.6 | 0.6 | 0.5 | 0.5 | 0.4 |
| P | 0.002 | 0.017 | 0.039 | 0.049 | 0.100 | 0.150 |
| Si | <0.01 | <0.01 | <0.01 | <0.01 | <0.01 | <0.01 |
| Pb | <0.001 | <0.001 | <0.001 | <0.001 | <0.001 | <0.001 |
| Cu | Balance | Balance | Balance | Balance | Balance | Balance |
| Flowability of molten metal | Δ | Δ | ○ | Δ | Δ | ○ |
| Mechanical properties | ○ | ○ | ○ | ○ | ○ | ○ |
| Tensile strength | 228 | 259 | 269 | 263 | 281 | 265 |
| Elongation | 25.4 | 31.2 | 34.6 | 35.2 | 29.1 | 17.6 |
| Liquid penetrant testing | X | ○ | ○ | ○ | ○ | Δ |

TABLE 5-continued

| | | | | | | |
|---|---|---|---|---|---|---|
| Leaching | ○ | ○ | ○ | ○ | ○ | ○ |
| Machinability coefficient | 77.6 | 72.7 | 72.7 | 80.2 | 79.2 | 79.7 |
| Surface roughness | 0.9 | 0.8 | 0.7 | 0.9 | 0.9 | 0.7 |
| Shape of chips | ○ | ○ | ○ | ○ | ○ | ○ |
| Evaluation of Machinability | ○ | ○ | ○ | ○ | ○ | ○ |
| General | X | Δ | ○ | Δ | Δ | Δ |

| | Example 31 of the invention | Example 32 of the invention | Example 33 of the invention | Example 34 of the invention | Example 35 of the invention | Example 36 of the invention |
|---|---|---|---|---|---|---|
| Element | | | | | | |
| Ni | 2.5 | 2.5 | 2.5 | 2.5 | 2.5 | 2.5 |
| Sn | 3.6 | 3.6 | 3.8 | 3.7 | 3.6 | 3.5 |
| Zn | 7.1 | 7.1 | 7.3 | 7.1 | 7.2 | 7.2 |
| Bi | 0.5 | 0.5 | 0.5 | 0.5 | 0.4 | 0.5 |
| P | 0.009 | 0.014 | 0.028 | 0.040 | 0.100 | 0.150 |
| Si | <0.01 | <0.01 | <0.01 | <0.01 | <0.01 | <0.01 |
| Pb | <0.001 | <0.001 | <0.001 | <0.001 | <0.001 | <0.001 |
| Cu | Balance | Balance | Balance | Balance | Balance | Balance |
| Flowability of molten metal | Δ | Δ | Δ | Δ | Δ | ○ |
| Mechanical properties | ○ | ○ | ○ | ○ | ○ | ○ |
| Tensile strength | 261 | 254 | 263 | 270 | 267 | 293 |
| Elongation | 35.6 | 32.4 | 29.7 | 29.5 | 20.2 | 26.0 |
| Liquid penetrant testing | ○ | ○ | ○ | Δ | Δ | Δ |
| Leaching | ○ | ○ | ○ | ○ | ○ | ○ |
| Machinability coefficient | 75.7 | 80.0 | 79.9 | 79.1 | 75.2 | 76.4 |
| Surface roughness | 0.8 | 1.0 | 0.8 | 0.9 | 0.8 | 0.9 |
| Shape of chips | ○ | ○ | ○ | ○ | ○ | ○ |
| Evaluation of Machinability | ○ | ○ | ○ | ○ | ○ | ○ |
| General | Δ | Δ | Δ | Δ | Δ | Δ |

| | Comparative Example 18 | Example 7 of the invention | Example 37 of the invention | Example 38 of the invention | Comparative Example 19 |
|---|---|---|---|---|---|
| Element | | | | | |
| Ni | 2.5 | 2.5 | 2.5 | 2.5 | 2.4 |
| Sn | 5.0 | 5.2 | 5.2 | 5.0 | 5.1 |
| Zn | 7.2 | 6.0 | 7.1 | 7.1 | 7.1 |
| Bi | 0.5 | 0.6 | 0.5 | 0.4 | 0.5 |
| P | 0.008 | 0.015 | 0.043 | 0.089 | 0.160 |
| Si | <0.01 | <0.01 | <0.01 | <0.01 | <0.01 |
| Pb | <0.001 | <0.001 | <0.001 | <0.001 | <0.001 |
| Cu | Balance | Balance | Balance | Balance | Balance |
| Flowability of molten metal | ○ | Δ | Δ | ○ | Δ |
| Mechanical properties | ○ | ○ | ○ | ○ | X |
| Tensile strength | 253 | 273 | 246 | 286 | 255 |
| Elongation | 22.7 | 26.8 | 17.6 | 21.5 | 14.5 |
| Liquid penetrant testing | X | Δ | ○ | Δ | ○ |
| Leaching | ○ | ○ | ○ | ○ | ○ |
| Machinability coefficient | 75.9 | 76.7 | 80.4 | 80.2 | 79.3 |
| Surface roughness | 0.9 | 0.9 | 0.9 | 0.9 | 0.8 |
| Shape of chips | ○ | ○ | ○ | ○ | ○ |
| Evaluation of Machinability | ○ | ○ | ○ | ○ | ○ |
| General | X | Δ | Δ | Δ | X |

TABLE 6

| Element | Comparative Example 1 | Example 39 of the invention | Comparative Example 20 | Comparative Example 21 | Comparative Example 22 | Comparative Example 23 |
|---|---|---|---|---|---|---|
| Ni | 0.2 | 2.6 | 2.5 | 2.5 | 2.5 | 2.5 |
| Sn | 5.8 | 2.4 | 2.4 | 5.0 | 2.6 | 2.4 |
| Zn | 5.1 | 6.2 | 5.9 | 2.1 | 6.5 | 11.5 |
| Bi | — | 0.5 | 0.5 | 0.5 | 0.5 | 0.4 |
| P | 0.021 | 0.014 | 0.010 | 0.020 | 0.028 | 0.020 |
| Si | — | <0.01 | <0.01 | 0.02 | 0.25 | 0.25 |
| Pb | 5.4 | 0.2 | 0.5 | <0.001 | <0.001 | <0.001 |
| Cu | Balance | Balance | Balance | Balance | Balance | Balance |
| Flowability of molten metal | Reference | Δ | Δ | X | ○ | ○ |
| Mechanical properties | | ○ | ○ | ○ | ○ | X |
| Tensile strength | 195 | 217 | 216 | 263 | 270 | 277 |
| Elongation | 15 | 23.5 | 21.2 | 25.4 | 22.9 | 10.2 |
| Liquid penetrant testing | Reference | Δ | X | Δ | X | X |
| Leaching | X | Δ | Δ | — | — | — |
| Machinability coefficient | Reference | 75.9 | — | — | — | — |
| Surface roughness | | 0.9 | — | — | — | — |
| Shape of chips | | ○ | — | ○ | ○ | |
| Evaluation of Machinability | | ○ | — | — | — | — |
| General | | Δ | X | X | X | X |

<Test for Flowability of Molten Metal>

The heated and melted copper alloy of each of examples of the invention and comparative examples was cast into the spiral test mold shown in FIG. 1 at a casting temperature of 1100 to 1200° C. The test mold is a spiral frame which comprises a plurality of quarter arc portions that are connected to each other. The initial quarter arc portion has a radius of 95 mm and includes graduations formed at equal intervals of 18.65 mm to divide the quarter arc portion into eight sections. The next quarter arc portion has a radius of 89 mm and has graduations arranged at equal intervals of 17.47 mm to divide the quarter arc into eight sections. Similarly, each of the other quarter arc portions are divided by graduations arranged at equal intervals into eight sections. Each of the figures in brackets in FIG. 1 indicates the intervals (mm) of the graduations in each quarter arc, and each of the numbers in circles indicates the number of the graduations present between the starting point and the circled number. In the test, the molten copper alloy of each example was cast into the space radially inside the portion of the frame indicated by the circled number 1. The point at which the molten alloy had ultimately reached is indicated in the table by the circled number of the quarter arc portion that is located radially outwardly of this point.

Figure 2:
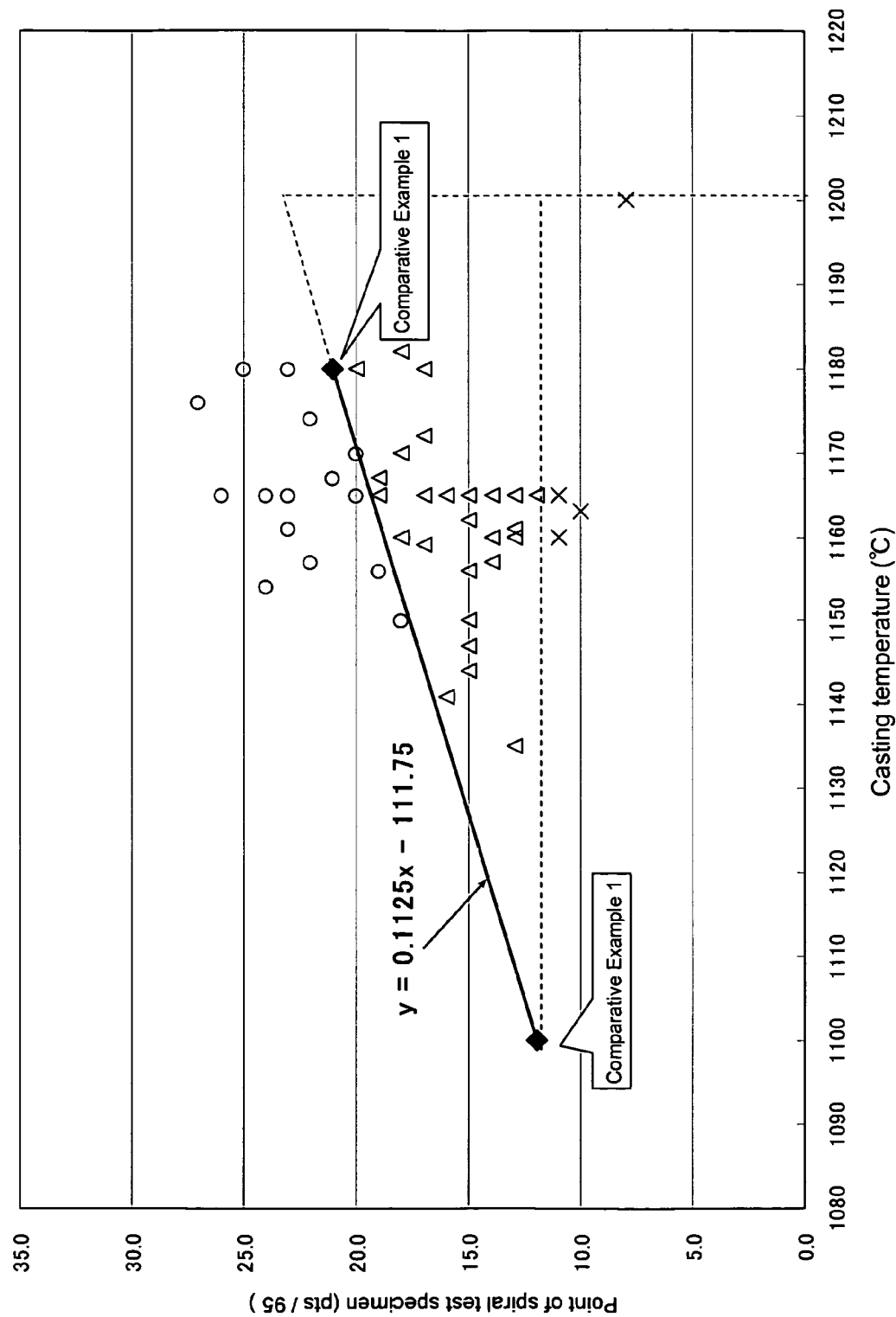
FIG. 2 is a graph showing the reference straight line by a reference material in the test for flowability of molten metal, and data on other examples.

The numbers of the graduations (points) at which the reference material CAC406 (Comparative Example 1) had reached at the casting temperatures of 1100° C. and 1180° C. were 12.0 and 21.0, respectively. The numbers of the graduations for the other copper alloys are also shown in Table 7. The relations between the above points and the casting temperatures for the respective examples were plotted on the graph of FIG. 2, of which the vertical axis indicates the point at which each molten copper alloy had reached and the horizontal axis indicates the casting temperature. Of the plotted points on FIG. 2, those located above the line connecting the values for CAC406 and expressed by the below equation (3), i.e. those located above the right-angled triangle in FIG. 2, are indicated by symbols "○", those located below the above line for CAC406 but higher than 12.0 points at a casting temperature near 1200° C. are indicated by symbols "Δ", and those located below 12.0 points even at a casting temperature near 1200° C. are indicated by "X" in view of practical operations. These results are shown in Table 7. In equation (3), X indicates the casting temperature and Y indicates the reference value of graduations.

TABLE 7

| | Casting temperature (° C.) | Ideal limit value calculated from temperature | Measurement points | Flowability of molten metal |
|---|---|---|---|---|
| Example 1 of the invention | 1161 | ≧18.9 | 13 | Δ |
| Example 2 of the invention | 1182 | ≧21.2 | 18 | Δ |

TABLE 7-continued

| | Casting temperature (° C.) | Ideal limit value calculated from temperature | Measurement points | Flowability of molten metal |
|---|---|---|---|---|
| Example 3 of the invention | 1160 | ≧18.8 | 18 | Δ |
| Example 4 of the invention | 1167 | ≧19.5 | 21 | ○ |
| Example 5 of the invention | 1165 | ≧19.3 | 20 | ○ |
| Example 6 of the invention | 1165 | ≧19.3 | 15 | Δ |
| Example 7 of the invention | 1172 | ≧20.1 | 17 | Δ |
| Example 8 of the invention | 1150 | ≧17.6 | 18 | ○ |
| Example 9 of the invention | 1165 | ≧19.3 | 23 | ○ |
| Example 10 of the invention | 1165 | ≧19.3 | 15 | Δ |
| Example 11 of the invention | 1165 | ≧19.3 | 16 | Δ |
| Example 12 of the invention | 1165 | ≧19.3 | 16 | Δ |
| Example 13 of the invention | 1165 | ≧19.3 | 14 | Δ |
| Example 14 of the invention | 1159 | ≧18.6 | 17 | Δ |
| Example 15 of the invention | 1165 | ≧19.3 | 24 | ○ |
| Example 16 of the invention | 1157 | ≧18.4 | 14 | Δ |
| Example 17 of the invention | 1157 | ≧18.4 | 22 | ○ |
| Example 18 of the invention | 1141 | ≧16.6 | 16 | Δ |
| Example 19 of the invention | 1165 | ≧19.3 | 14 | Δ |
| Example 20 of the invention | 1160 | ≧18.8 | 14 | Δ |
| Example 21 of the invention | 1180 | ≧21.0 | 20 | Δ |
| Example 22 of the invention | 1170 | ≧19.9 | 20 | ○ |
| Example 23 of the invention | 1156 | ≧18.3 | 19 | ○ |
| Example 24 of the invention | 1162 | ≧19.0 | 15 | Δ |
| Example 25 of the invention | 1180 | ≧21.0 | 21 | ○ |
| Example 26 of the invention | 1180 | ≧21.0 | 25 | ○ |
| Example 27 of the invention | 1154 | ≧18.1 | 24 | ○ |
| Example 28 of the invention | 1165 | ≧19.3 | 19 | Δ |
| Example 29 of the invention | 1165 | ≧19.3 | 13 | Δ |
| Example 30 of the invention | 1161 | ≧18.9 | 23 | ○ |
| Example 31 of the invention | 1165 | ≧19.3 | 16 | Δ |
| Example 32 of the invention | 1165 | ≧19.3 | 12 | Δ |
| Example 33 of the invention | 1156 | ≧18.3 | 15 | Δ |
| Example 34 of the invention | 1144 | ≧17.0 | 15 | Δ |
| Example 35 of the invention | 1165 | ≧19.3 | 17 | Δ |
| Example 36 of the invention | 1165 | ≧19.3 | 20 | ○ |
| Example 37 of the invention | 1165 | ≧19.3 | 16 | Δ |
| Example 38 of the invention | 1165 | ≧19.3 | 24 | ○ |
| Example 39 of the invention | 1180 | ≧21.0 | 17 | Δ |

TABLE 7-continued

|  | Casting temperature (° C.) | Ideal limit value calculated from temperature | Measurement points | Flowability of molten metal |
|---|---|---|---|---|
| Comparative Example 1 | 1100 | Reference | 12 | Reference |
| Comparative Example 1 | 1180 | Reference | 21 | Reference |
| Comparative Example 2 | 1163 | ≧19.1 | 10 | X |
| Comparative Example 3 | 1160 | ≧18.8 | 11 | X |
| Comparative Example 4 | 1165 | ≧19.3 | 26 | ◯ |
| Comparative Example 5 | 1135 | ≧15.9 | 13 | Δ |
| Comparative Example 6 | 1150 | ≧17.6 | 15 | Δ |
| Comparative Example 7 | 1167 | ≧19.5 | 19 | Δ |
| Comparative Example 8 | 1147 | ≧17.3 | 15 | Δ |
| Comparative Example 9 | 1170 | ≧19.9 | 18 | Δ |
| Comparative Example 10 | 1165 | ≧19.3 | 17 | Δ |
| Comparative Example 11 | 1165 | ≧19.3 | 16 | Δ |
| Comparative Example 12 | 1180 | ≧21.0 | 23 | ◯ |
| Comparative Example 13 | 1160 | ≧18.8 | 13 | Δ |
| Comparative Example 14 | 1165 | ≧19.3 | 11 | X |
| Comparative Example 15 | 1165 | ≧19.3 | 11 | X |
| Comparative Example 16 | 1165 | ≧19.3 | 20 | ◯ |
| Comparative Example 17 | 1165 | ≧19.3 | 19 | Δ |
| Comparative Example 18 | 1165 | ≧19.3 | 20 | ◯ |
| Comparative Example 19 | 1165 | ≧19.3 | 19 | Δ |
| Comparative Example 20 | 1182 | ≧21.2 | 18 | Δ |
| Comparative Example 21 | 1200 | ≧23.3 | 8 | X |
| Comparative Example 22 | 1174 | ≧20.3 | 22 | ◯ |
| Comparative Example 23 | 1176 | ≧20.6 | 27 | ◯ |

$$Y = 0.1125 \times X - 111.75 \quad (3)$$

<Test for Mechanical Properties>

For the respective alloys, type A test specimens under JIS H 5120 were cast and then type 4 test specimens were machined under JIS Z 2201. Under JIS Z 2241, their tensile strength and elongation were measured. The results are shown in Table 8, and their evaluations are shown in Tables 1 to 6. Compared to Comparative Example 1 as the reference material, if both the tensile strength (MPa) and the elongation (%) are superior, the symbol "◯" is given, and if either of them is inferior, the symbol "X" is given.

TABLE 8

|  | Tensile strength (MPa) | Elongation (%) | Mechanical properties |
|---|---|---|---|
| Example 1 of the invention | 246 | 27.8 | ◯ |
| Example 2 of the invention | 259 | 31.2 | ◯ |
| Example 3 of the invention | 253 | 33.9 | ◯ |
| Example 4 of the invention | 248 | 34.7 | ◯ |
| Example 5 of the invention | 232 | 31.1 | ◯ |
| Example 6 of the invention | 293 | 31.4 | ◯ |
| Example 7 of the invention | 273 | 26.8 | ◯ |
| Example 8 of the invention | 273 | 28.0 | ◯ |
| Example 9 of the invention | 251 | 24.1 | ◯ |
| Example 10 of the invention | 257 | 46.2 | ◯ |
| Example 11 of the invention | 232 | 21.7 | ◯ |
| Example 12 of the invention | 247 | 19.3 | ◯ |
| Example 13 of the invention | 221 | 16.9 | ◯ |
| Example 14 of the invention | 233 | 20.8 | ◯ |
| Example 15 of the invention | 259 | 27.1 | ◯ |
| Example 16 of the invention | 278 | 22.5 | ◯ |
| Example 17 of the invention | 288 | 20.8 | ◯ |
| Example 18 of the invention | 252 | 31.0 | ◯ |

TABLE 8-continued

|  | Tensile strength (MPa) | Elongation (%) | Mechanical properties |
|---|---|---|---|
| Example 19 of the invention | 264 | 32.9 | ○ |
| Example 20 of the invention | 267 | 20.7 | ○ |
| Example 21 of the invention | 240 | 24.2 | ○ |
| Example 22 of the invention | 248 | 22.7 | ○ |
| Example 23 of the invention | 241 | 20.8 | ○ |
| Example 24 of the invention | 219 | 17.8 | ○ |
| Example 25 of the invention | 270 | 24.1 | ○ |
| Example 26 of the invention | 237 | 16.6 | ○ |
| Example 27 of the invention | 269 | 34.6 | ○ |
| Example 28 of the invention | 263 | 35.2 | ○ |
| Example 29 of the invention | 281 | 29.1 | ○ |
| Example 30 of the invention | 265 | 17.6 | ○ |
| Example 31 of the invention | 261 | 35.6 | ○ |
| Example 32 of the invention | 254 | 32.4 | ○ |
| Example 33 of the invention | 263 | 29.7 | ○ |
| Example 34 of the invention | 270 | 29.5 | ○ |
| Example 35 of the invention | 267 | 20.2 | ○ |
| Example 36 of the invention | 293 | 26.0 | ○ |
| Example 37 of the invention | 246 | 17.6 | ○ |
| Example 38 of the invention | 286 | 21.5 | ○ |
| Example 39 of the invention | 217 | 23.5 | ○ |
| Comparative Example 1 | ≧195 | ≧15 | Reference |
| Comparative Example 2 | 274 | 34.8 | ○ |
| Comparative Example 3 | 289 | 32.9 | ○ |
| Comparative Example 4 | 207 | 14.1 | X |
| Comparative Example 5 | 215 | 21.3 | ○ |
| Comparative Example 6 | 249 | 28.4 | ○ |
| Comparative Example 7 | 214 | 14.3 | X |
| Comparative Example 8 | 270 | 45.3 | ○ |
| Comparative Example 9 | 274 | 36.5 | ○ |
| Comparative Example 10 | 269 | 13.5 | X |
| Comparative Example 11 | 230 | 44.2 | ○ |
| Comparative Example 12 | 253 | 12.4 | X |
| Comparative Example 13 | 263 | 40.6 | ○ |
| Comparative Example 14 | 176 | 11.4 | X |
| Comparative Example 15 | 298 | 47.4 | ○ |
| Comparative Example 16 | 189 | 8.8 | X |
| Comparative Example 17 | 228 | 25.4 | ○ |
| Comparative Example 18 | 253 | 22.7 | ○ |
| Comparative Example 19 | 255 | 14.5 | X |
| Comparative Example 20 | 216 | 21.2 | ○ |
| Comparative Example 21 | 263 | 25.4 | ○ |
| Comparative Example 22 | 270 | 22.9 | ○ |
| Comparative Example 23 | 277 | 10.2 | X |

<Liquid Penetrant Testing for Stepped Test Specimens>

Figure 3:
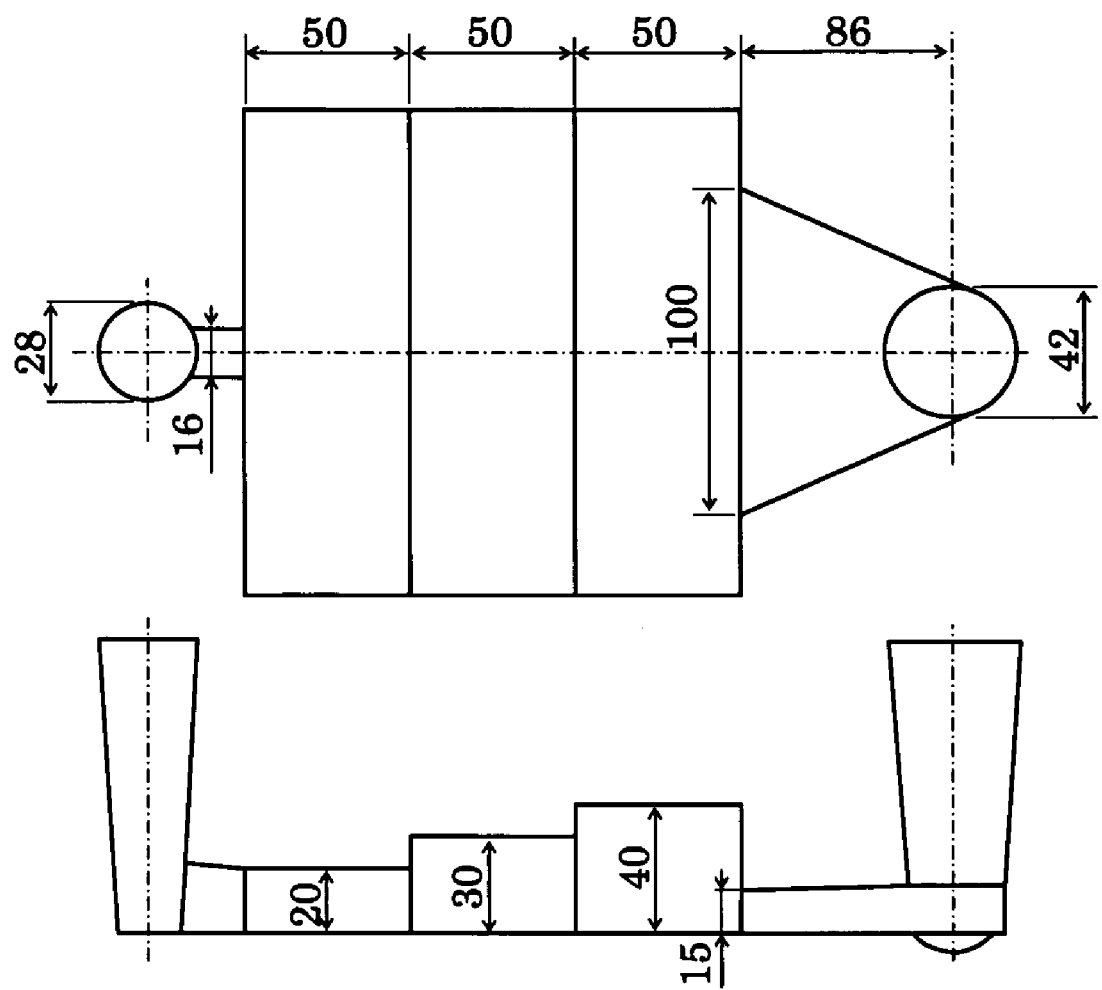
FIG. 3 shows a stepped mold which is less influenced by the feeding effect.
Figure 4A:
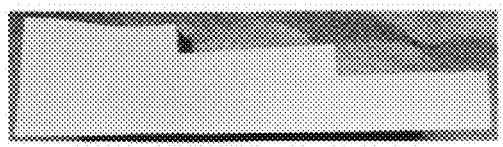
In FIG. 4(a), photos of sections of each stepped specimen show results of a liquid penetrant testing.
Figure 4A:
Figure 4A:
Figure 4A:
Figure 4A:
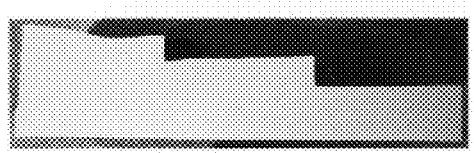
Figure 4A:
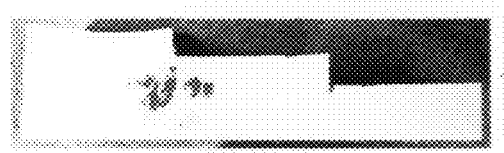
Figure 4A:
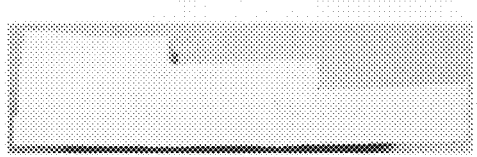
Figure 4A:
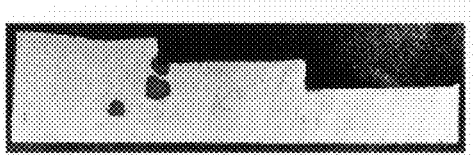
Figure 4A:
Figure 4A:
Figure 4A:
Figure 4A:
Figure 4A:
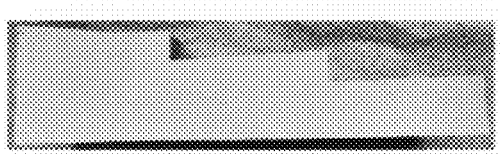
Figure 4A:
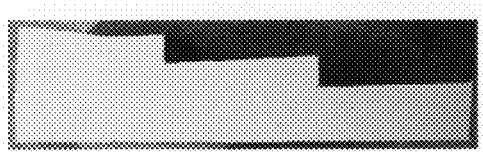
Figure 4A:
Figure 4A:
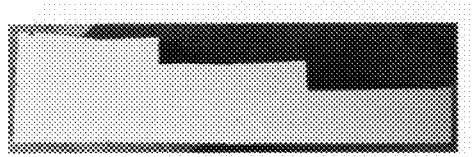
Figure 4C:
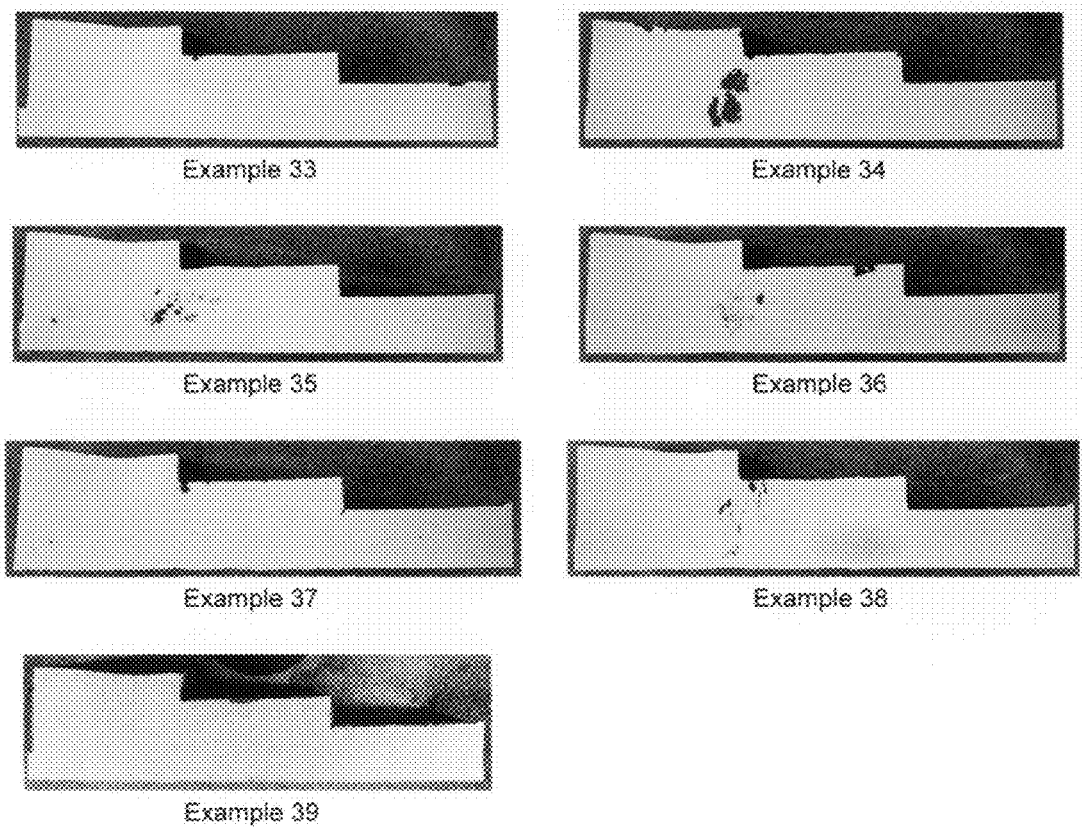
In FIG. 4(c), photos of sections of each stepped specimen show results of a liquid penetrant testing.
Figure 4D:
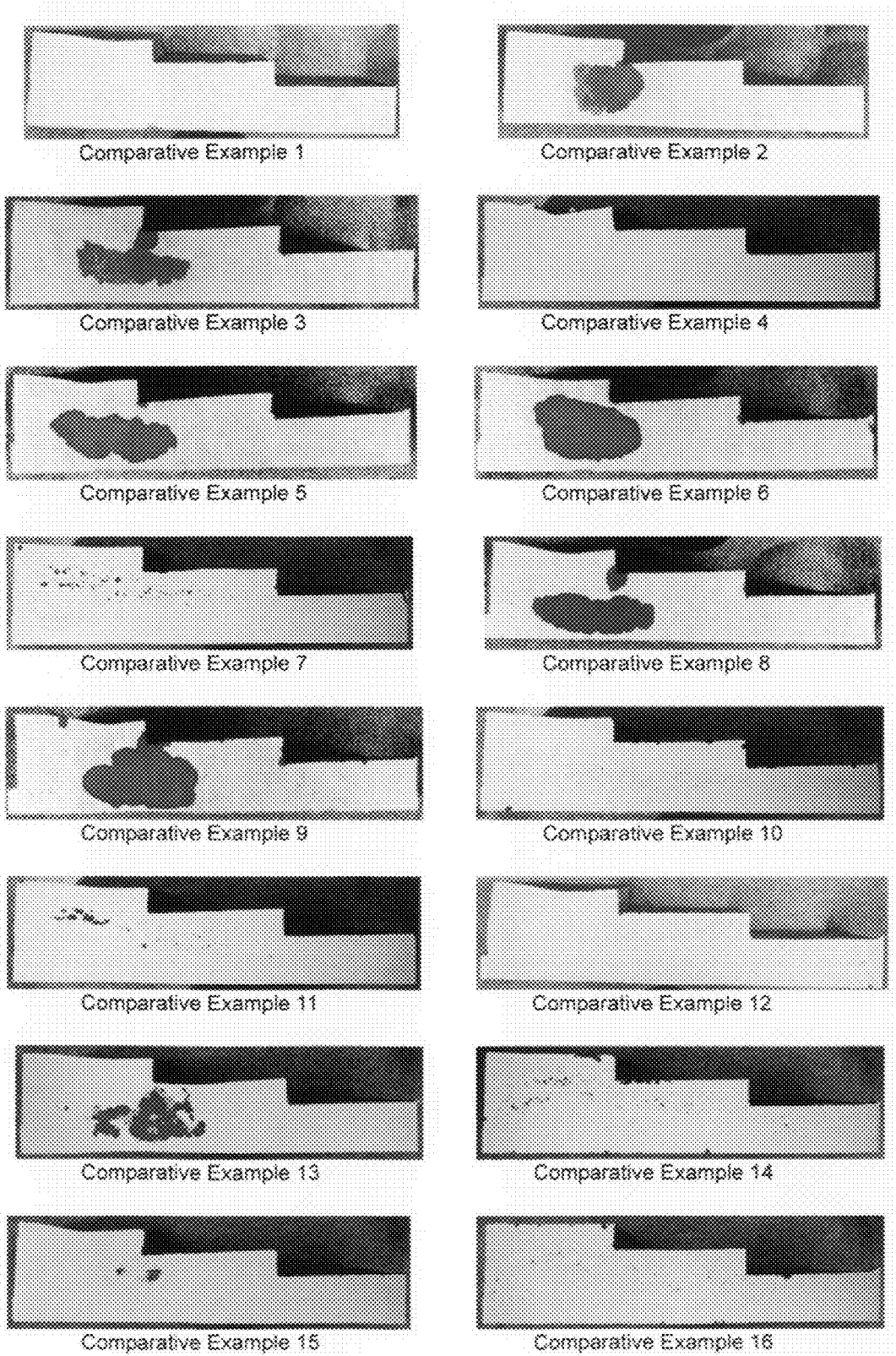
In FIG. 4(d), photos of sections of each stepped specimen show results of a liquid penetrant testing.
Figure 4E:
In FIG. 4(e), photos of sections of each stepped specimen show results of a liquid penetrant testing.
Figure 4E:
Figure 4E:
Figure 4E:
Figure 4E:
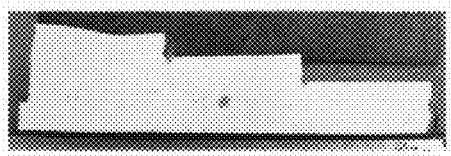
Figure 4E:
Figure 4E:
Figure 6A:
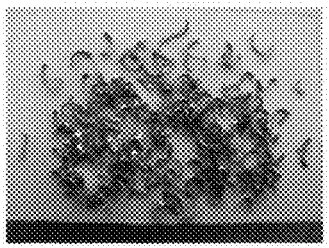
In FIG. 6(a), photos show the shapes of powder chips produced from Examples of the invention and Comparative Examples in a test for machinability.
Figure 6A:
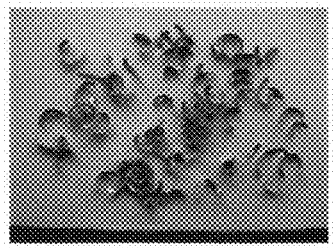
Figure 6A:
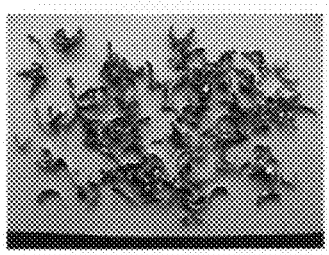
Figure 6A:
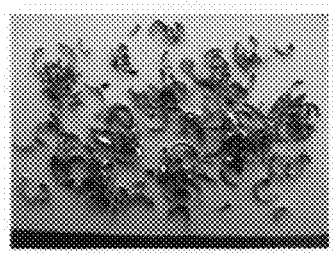
Figure 6A:
Figure 6A:
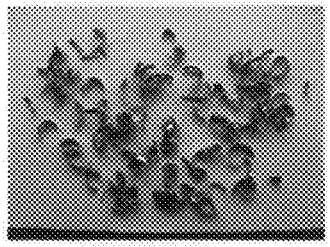
Figure 6A:
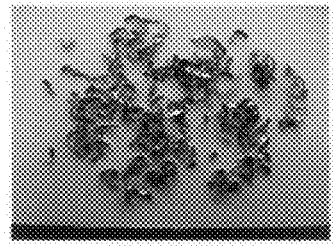
Figure 6A:
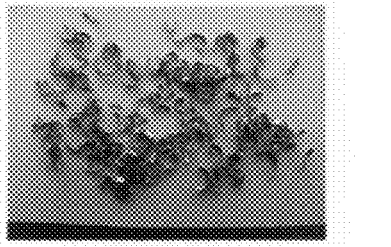
Figure 6A:
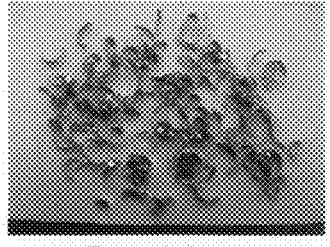
Figure 6A:
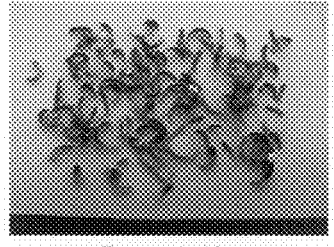
Figure 6A:
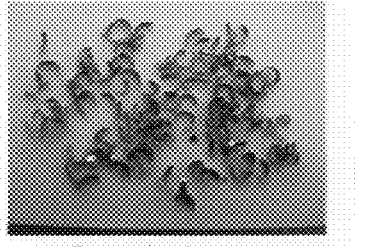
Figure 6A:
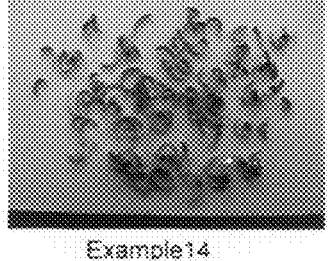
Figure 6A:
Figure 6A:
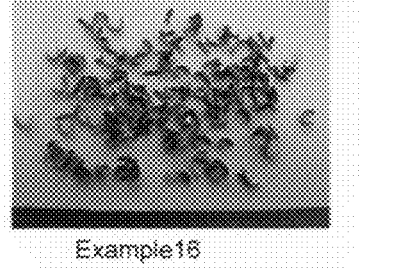
Figure 6B:
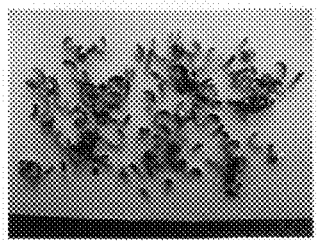
In FIG. 6(b), photos show the shapes of powder chips produced from Examples of the invention and Comparative Examples in a test for machinability.
Figure 6B:
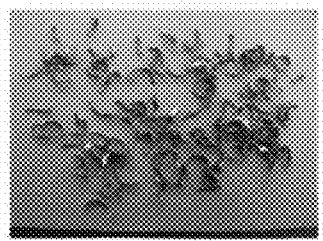
Figure 6B:
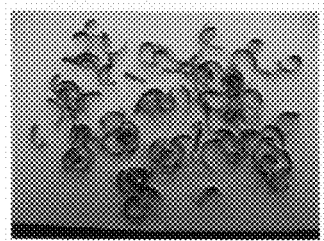
Figure 6B:
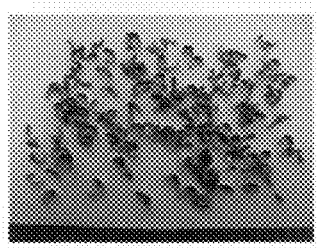
Figure 6B:
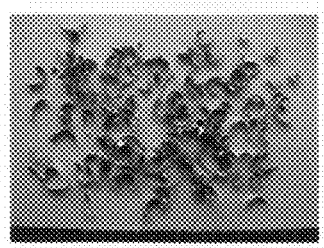
Figure 6B:
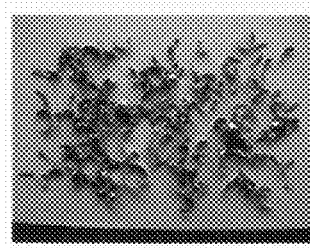
Figure 6B:
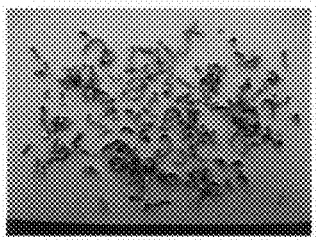
Figure 6B:
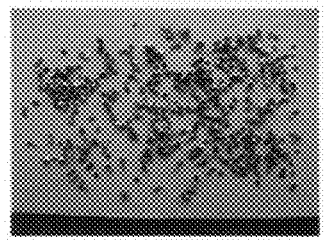
Figure 6B:
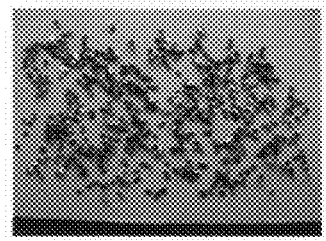
Figure 6B:
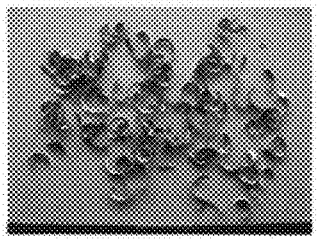
Figure 6B:
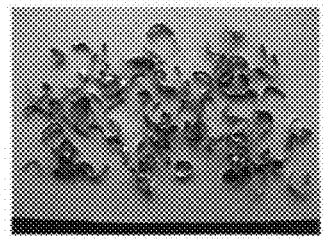
Figure 6B:
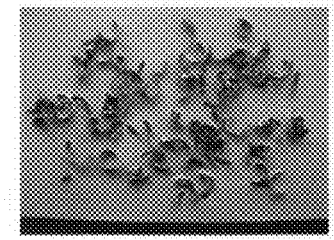
Figure 6B:
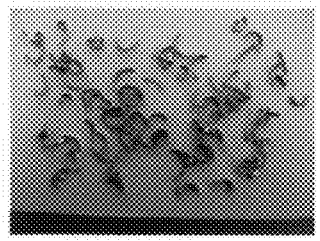
Figure 6B:
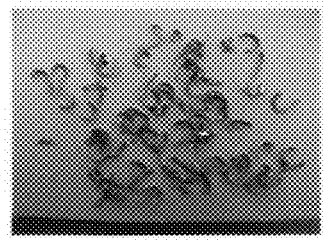
Figure 6B:
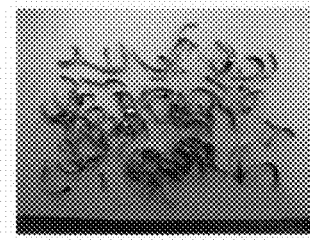
Figure 6C:
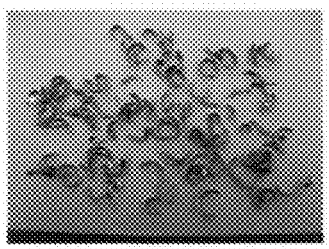
In FIG. 6(c), photos show the shapes of powder chips produced from Examples of the invention and Comparative Examples in a test for machinability.
Figure 6C:
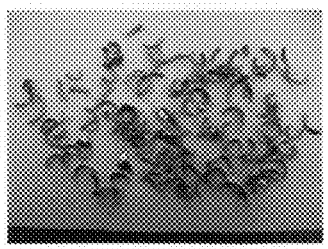
Figure 6C:
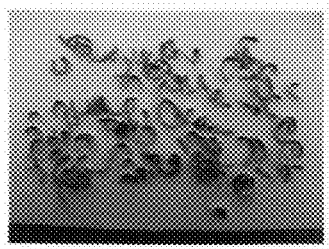
Figure 6C:
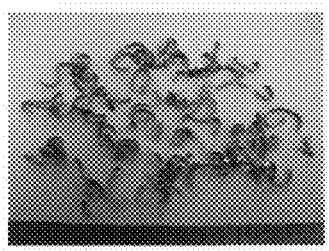
Figure 6C:
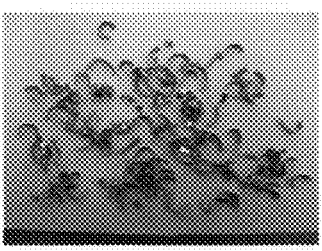
Figure 6C:
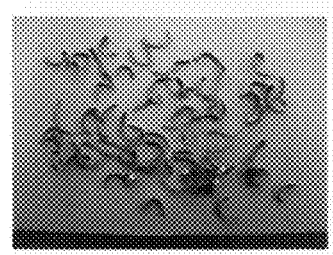
Figure 6C:
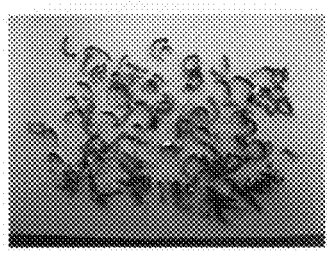
Figure 6C:
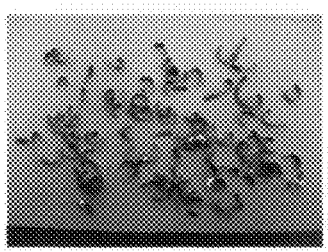
Figure 6C:
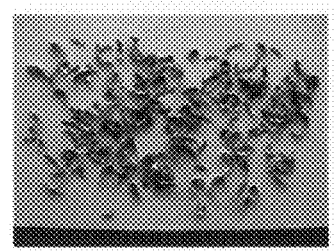
Figure 6D:
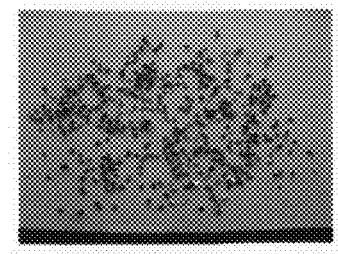
In FIG. 6(d), photos show the shapes of powder chips produced from Examples of the invention and Comparative Examples in a test for machinability.
Figure 6D:
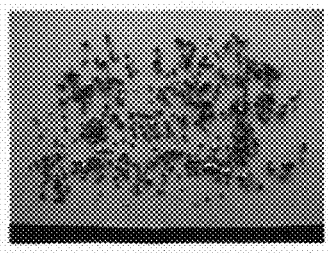
Figure 6D:
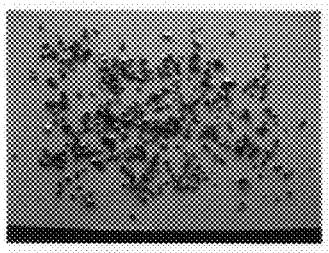
Figure 6D:
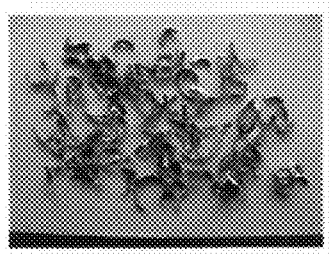
Figure 6D:
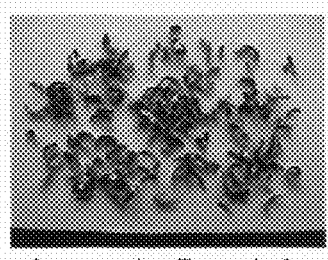
Figure 6D:
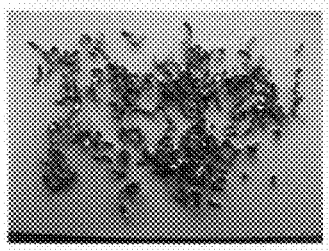
Figure 6D:
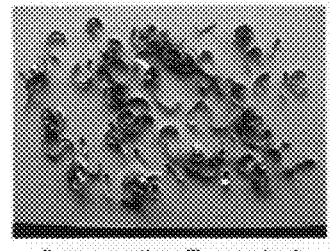
Figure 6D:
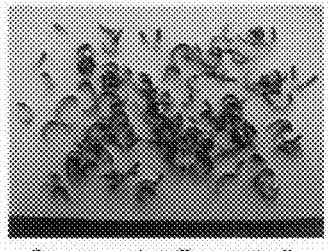
Figure 6D:
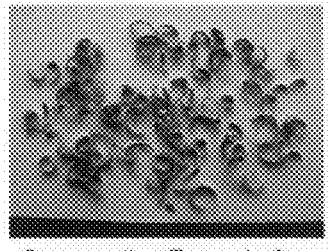
Figure 6D:
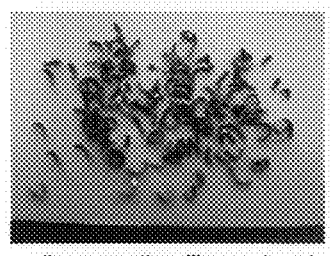
Figure 6D:
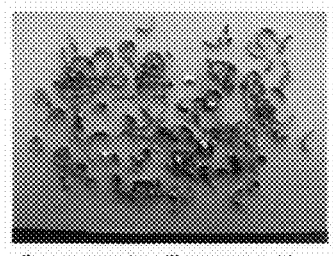
Figure 6D:
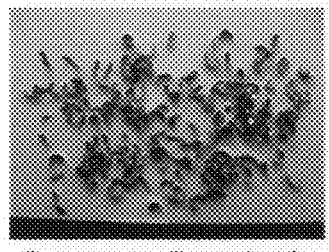
Figure 6D:
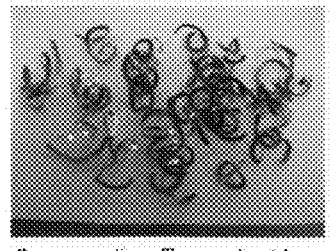
Figure 6D:
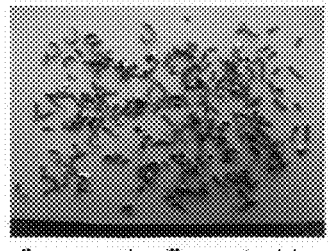
Figure 6D:
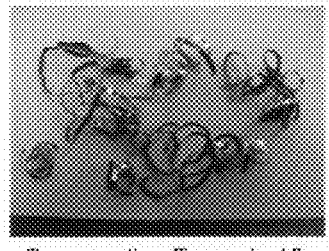
Figure 6E:
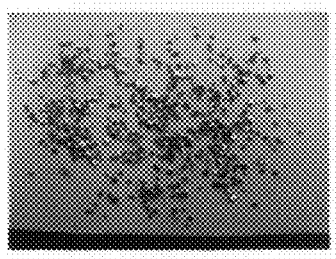
In FIG. 6(e), photos show the shapes of powder chips produced from Examples of the invention and Comparative Examples in a test for machinability.
Figure 6E:
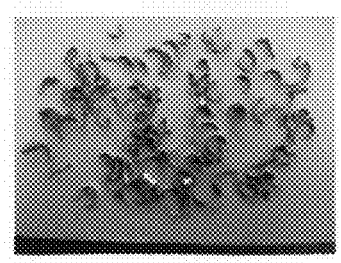
Figure 6E:
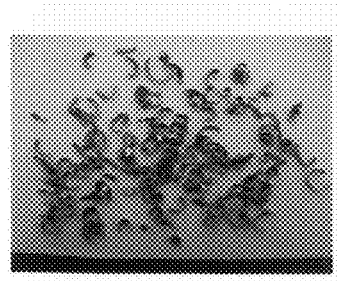
Figure 6E:
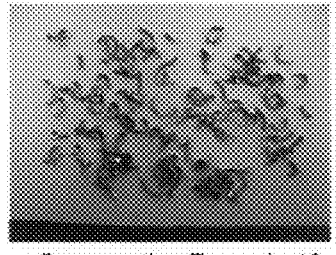
Figure 7A:
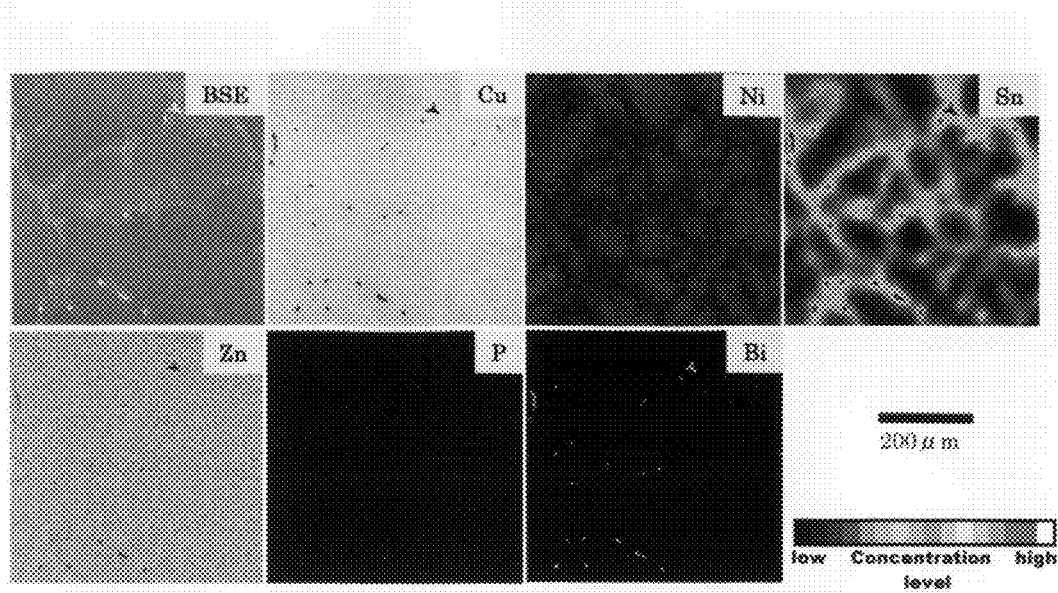
In FIG. 7(a), photos show the results of mapping analysis by EPMA.
Figure 7A:
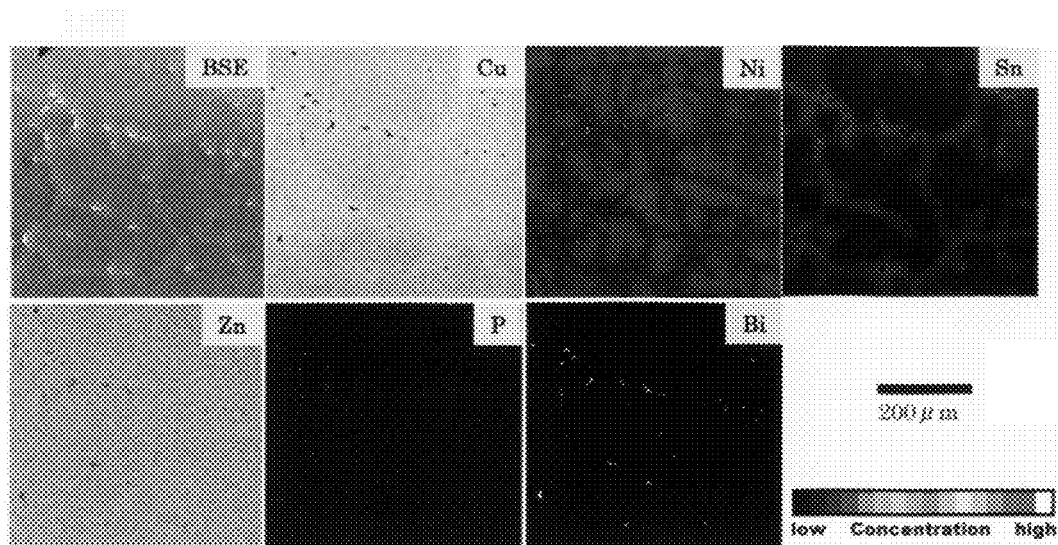
Figure 7B:
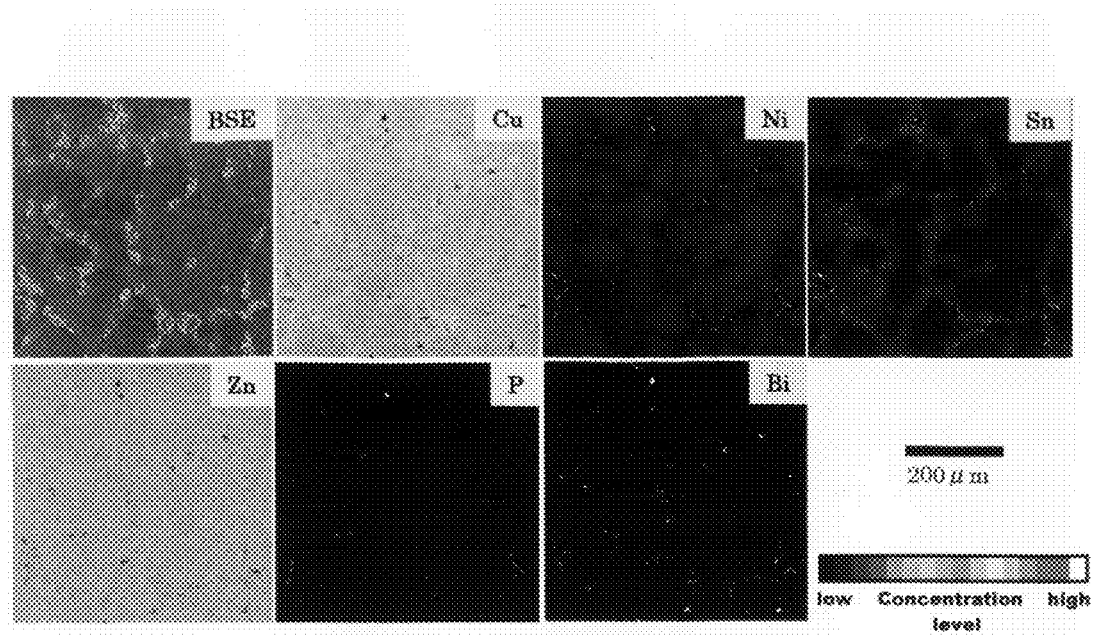
In FIG. 7(b), photos show the results of mapping analysis by EPMA.
Figure 7B:
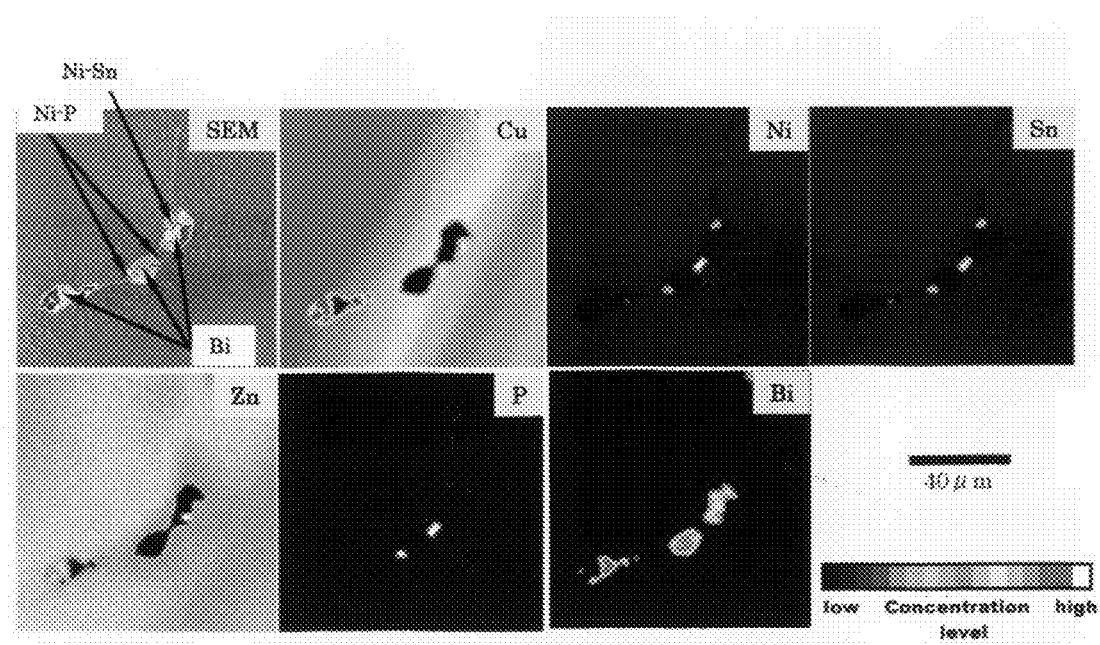
Figure 7C:
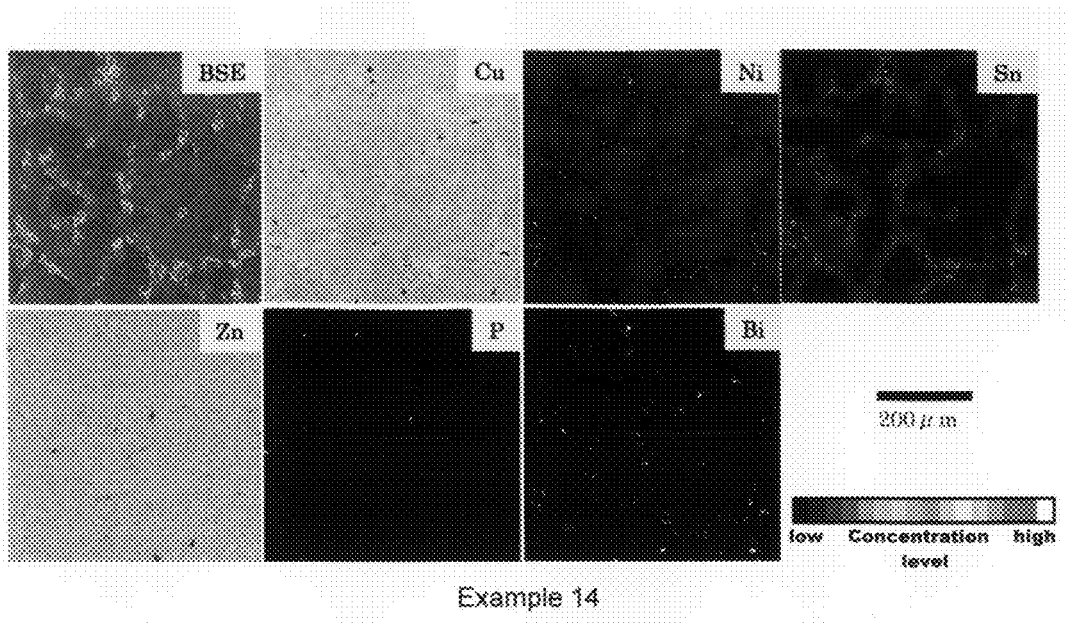
In FIG. 7(c), photos show the results of mapping analysis by EPMA.
Figure 7C:
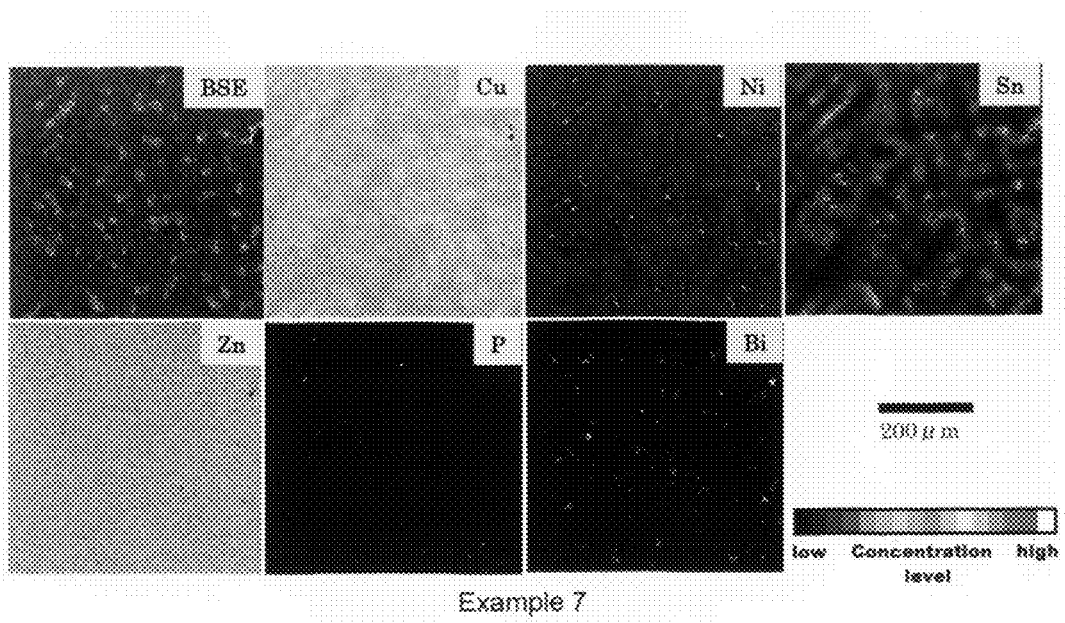
Figure 7D:
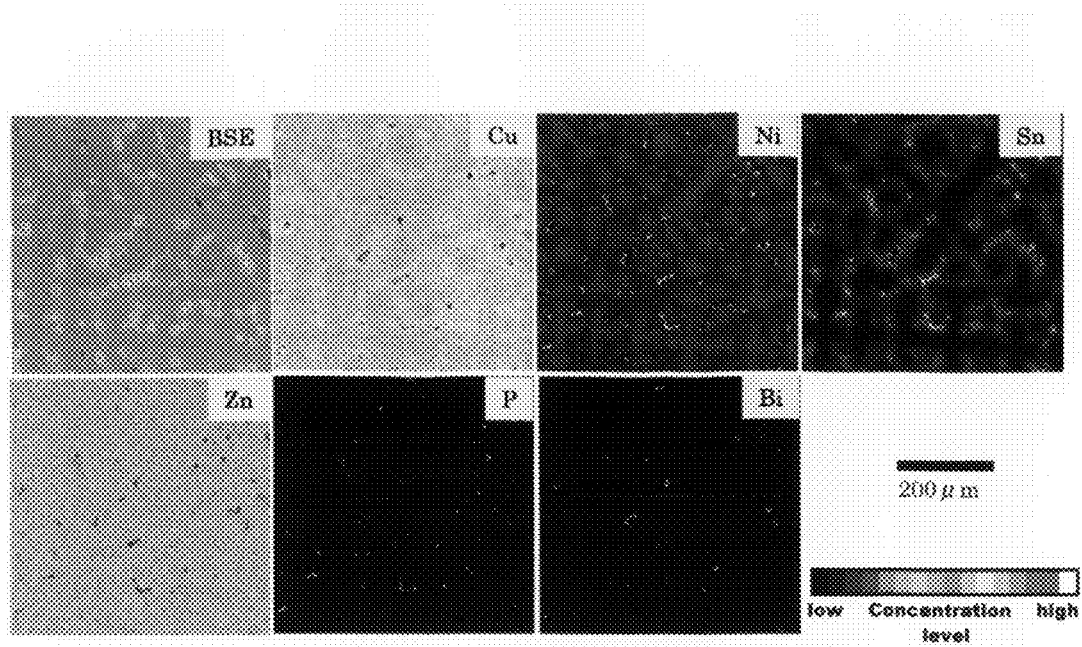
In FIG. 7(d), photos show the results of mapping analysis by EPMA.
Figure 7D:
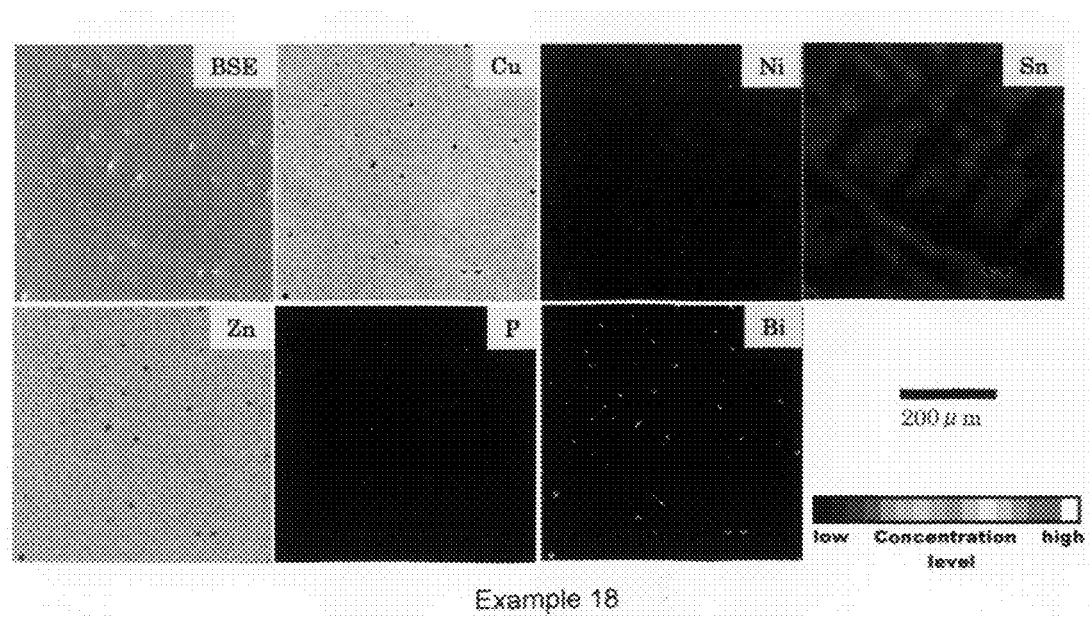
Figure 7E:
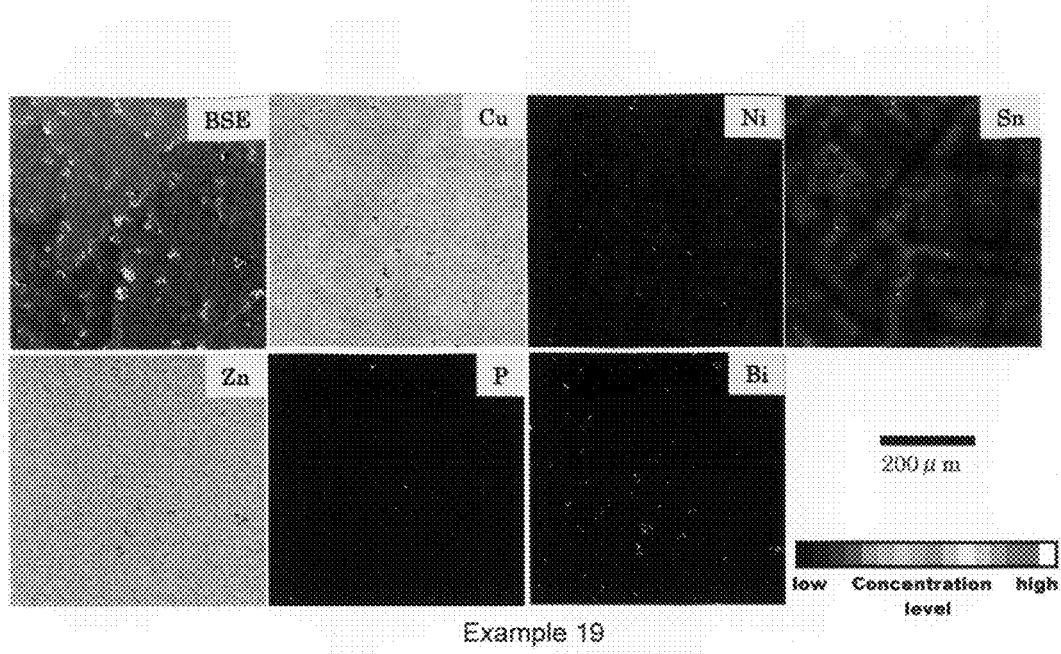
In FIG. 7(e), photos show the results of mapping analysis by EPMA.
Figure 7E:
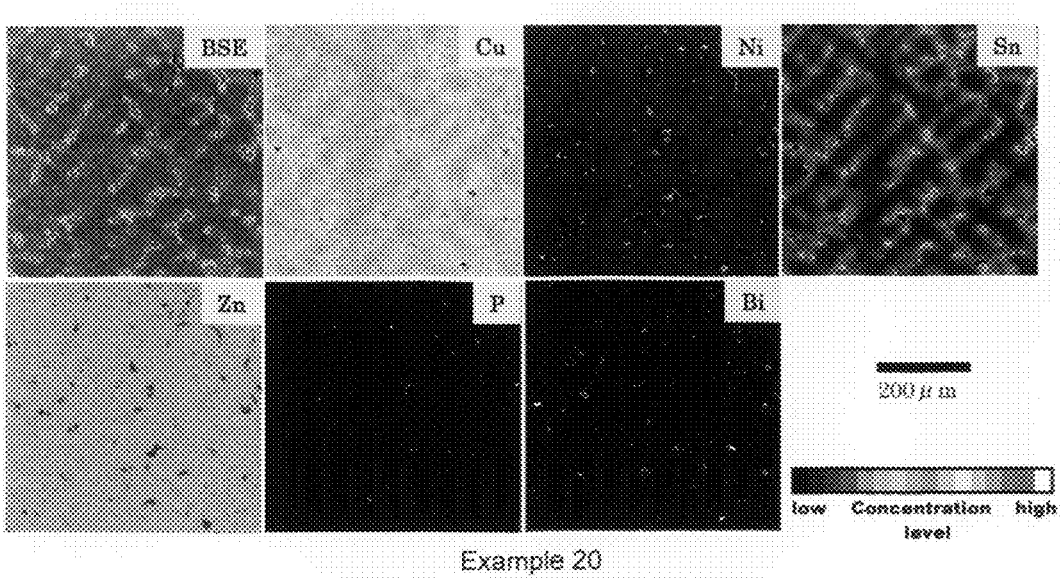
Figure 7F:
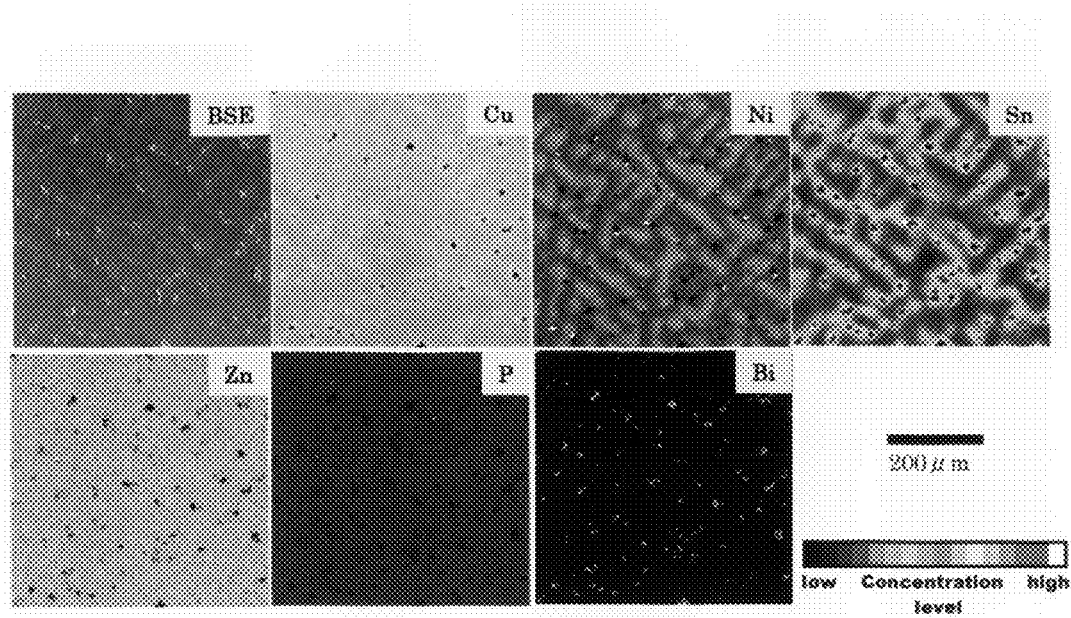
In FIG. 7(f), photos show the results of mapping analysis by EPMA.
Figure 7F:
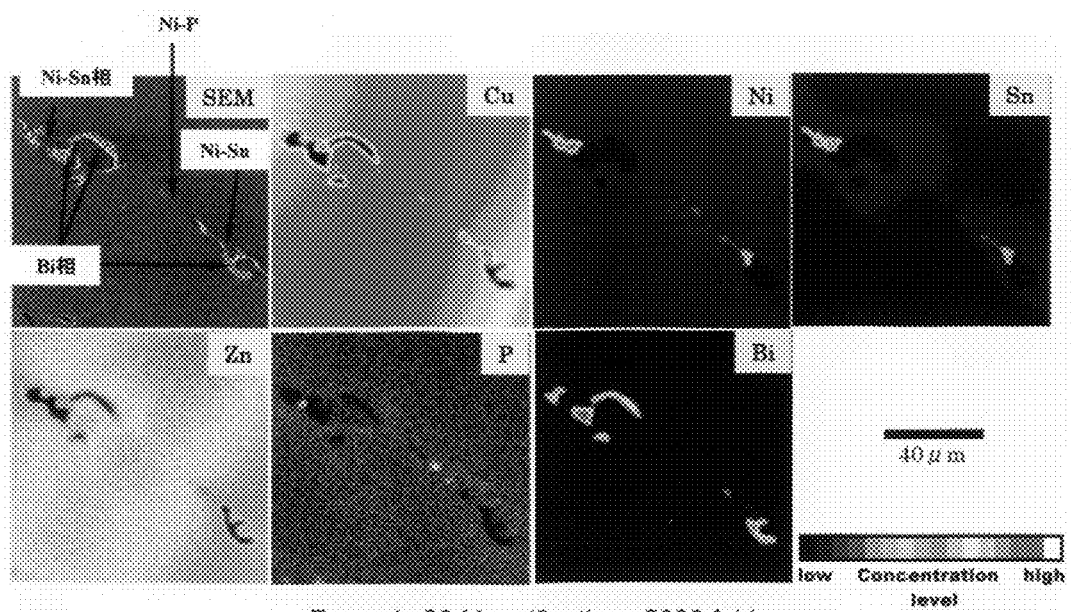
Figure 7H:
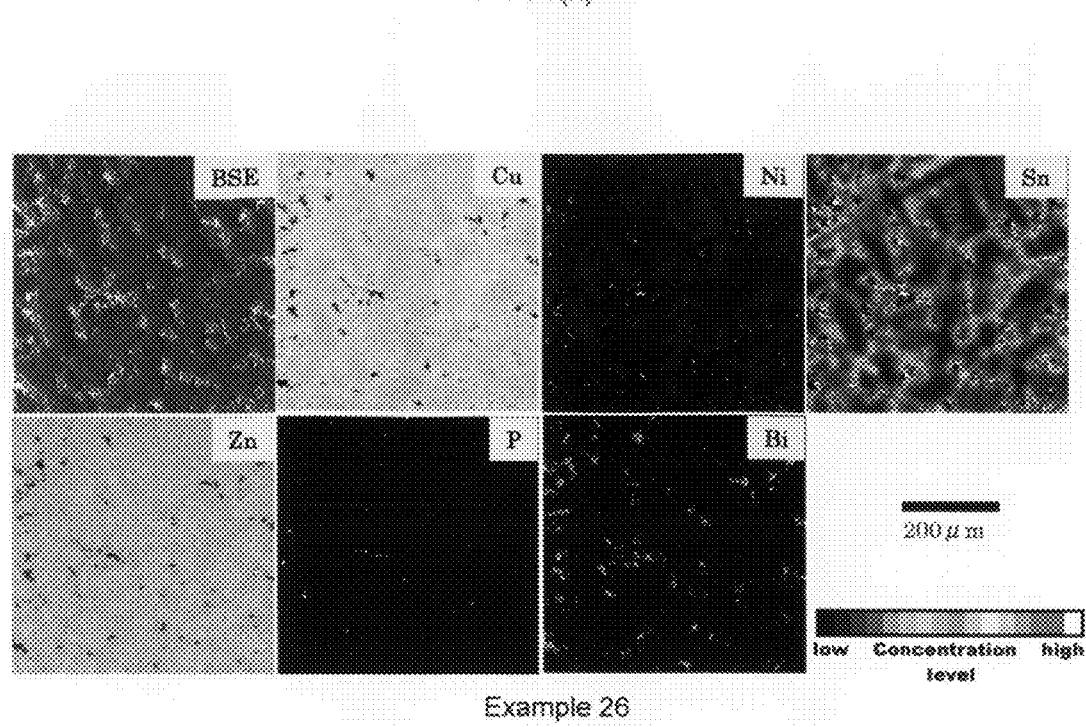
In FIG. 7(h), photos show the results of mapping analysis by EPMA.
Figure 7H:
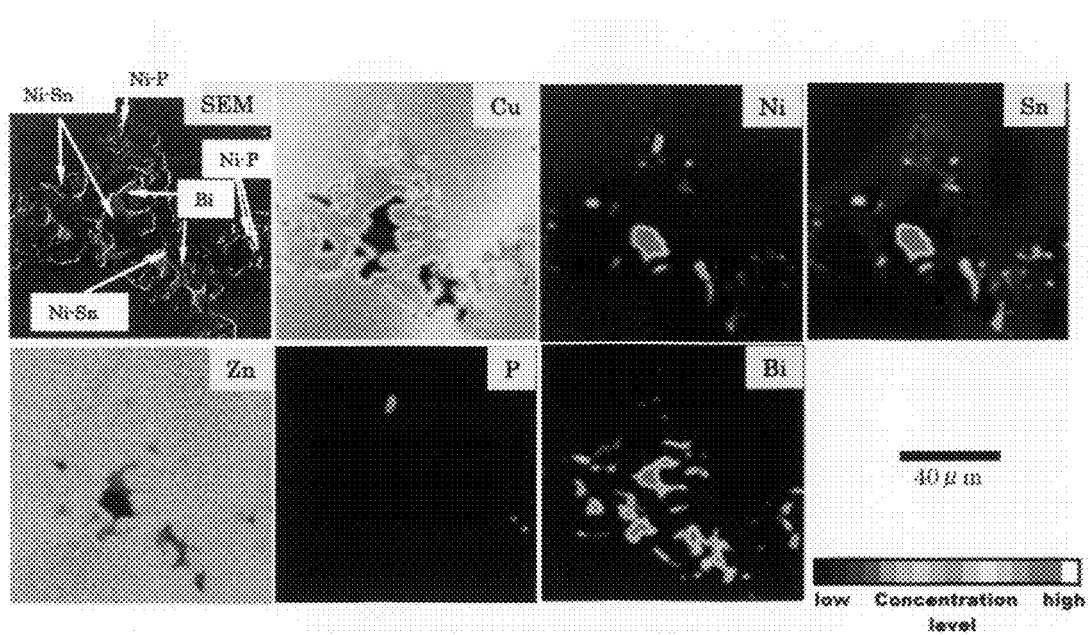
Figure 7I:
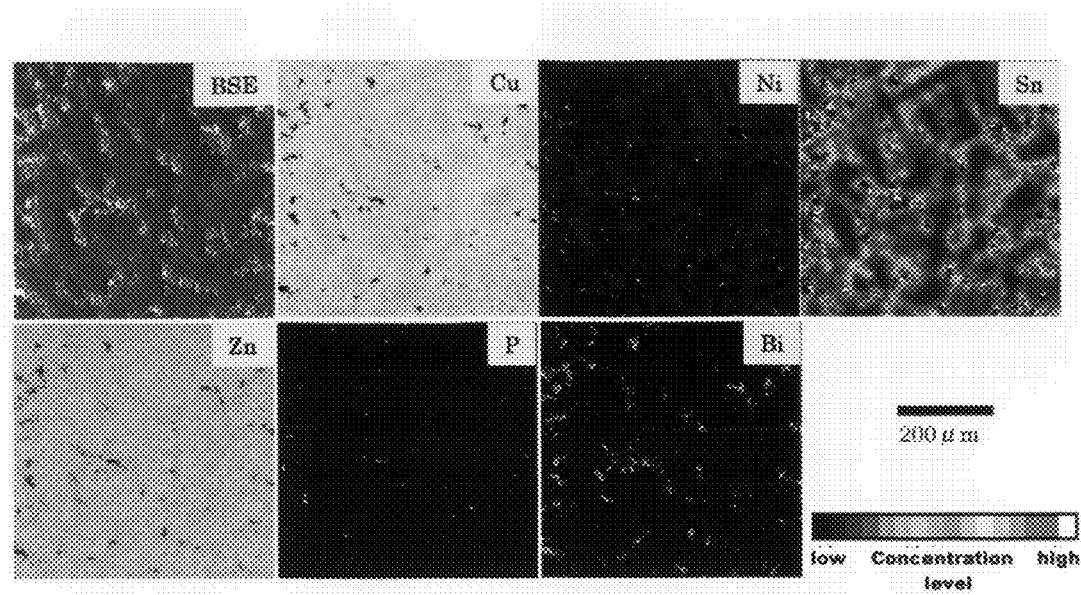
In FIG. 7(i), photos show the results of mapping analysis by EPMA.
Figure 7I:
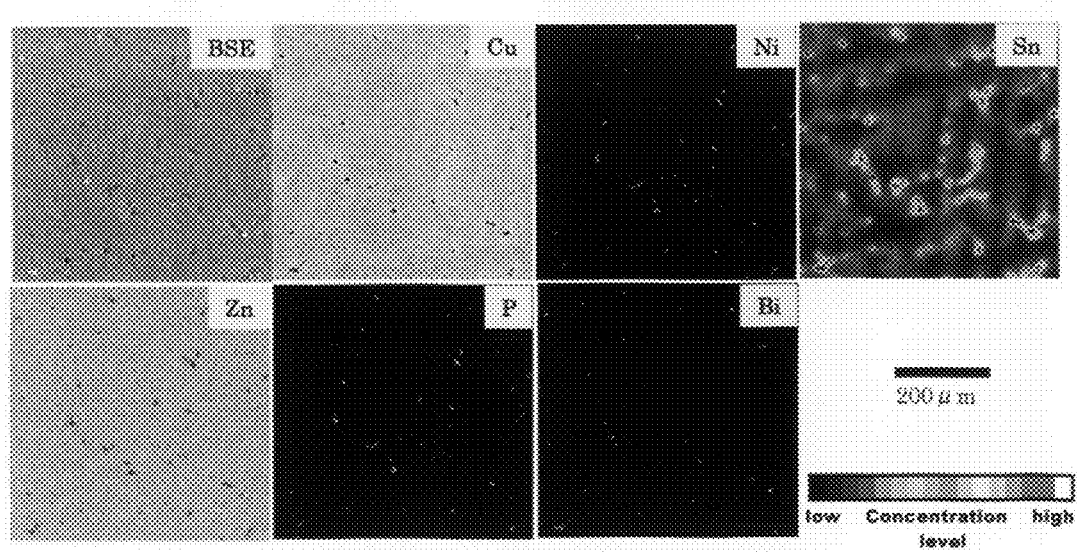

As shown in FIG. 3, a stepped $CO_2$ mold was prepared having three stepped portions having wall thicknesses of 20, 30 and 40 mm, respectively, to reduce the feeding effect, thereby making the test specimens more prone to casting defects. The castings produced by this mold were cut at their central portions and were subjected to a liquid penetrant testing under JIS Z 2343. In the test, the specimens were observed to determine whether they suffered casting defects and/or microporosity. The symbol "○" is given to specimens on which no pattern that indicates defects was found at their central portions in their wall thickness direction, and which can thus be produced by the same casting method as used for the reference material JIS CAC406. The symbol "Δ" (passable) is given to specimens on which a pattern that indicates defects was found at their central portions in their wall thickness direction, but which can still be produced by the same casting method as used for the reference material. But the castings to which the symbol "Δ" is given could suffer defects according to their shapes and the casting conditions. Thus, in producing them, their casting method and the like should also be taken into consideration. The symbol "X" is given to other castings. The test results are shown in the respective tables. Among them, photos of selected examples of the invention and comparative examples are shown in FIGS. 4(a) to 4(e). Among them, stain-like patterns seen on the outer perimeters of the sections of Examples 3, 20, 23, 25-28, 31-34, 36 and 39, of the invention, and Comparative Example 12 were caused by the coloring of the penetrant and have nothing to do with casting defects.

<Leaching Test>

The test was conducted based on a leaching test method under JWWA Z 108 and an analysis method of leachate under JWWA Z 110, both set by Japan Water Works Association. The test results are shown in Table 9, and their general evaluations are shown in Tables 1 to 6. The test was conducted with the ratio of contact area between the test pieces and the leaching solution set at 1000 $cm^2/l$, except Example 27 of the invention, of which the test was conducted under more harsh leaching conditions of 2000 $cm^2/l$. For the leaching amounts of lead, zinc and copper, determination was made using values of which their upper limits had been corrected to 100-fold values. For lead, however, for leaching values that exceeded the reference value of 0.001 mg/l, values corrected by multiplying these values by $1/100$ are also described in the table as values used for actual determination. For zinc and copper too, for values that exceeded their reference values, values corrected by multiplying these values by $1/100$ are also described in the table. These corrected values are ordinarily used as decision criteria because it is extremely difficult to achieve the predetermined reference values. The symbol "○" is given to specimens which satisfy the requirements without correction (not more than 0.001 mg/l) for lead, and which at least satisfy the requirements after correction for elements other than lead. The symbol "Δ" is given to specimens which does not satisfy the requirements without correction for lead, and which satisfy the requirements after correction for other elements. The symbol "X" is given to specimens which neither satisfy the requirements without correction for lead, and the requirements after correction for other elements. Comparative Example 1, which contains 4 to 6% by weight of lead, does not satisfy the leaching requirements for lead even after correction. The symbol "X" is given to Comparative Examples 5 to 8, 13 and 14, because these examples do not satisfy the requirements for chromaticity.

TABLE 9

| | Leaching value (mg/l) | | | | | | | | |
|---|---|---|---|---|---|---|---|---|---|
| | Pb (≦0.001) | Zn (≦0.1) | Cu (≦0.1) | Cd (≦0.001) | Taste | Odor | Chromaticity (≦0.5) | Turbidity (≦0.2) | Leaching properties |
| Example 1 of the invention | <0.0005 | 0.55 (after correction 0.0055) | 0.10 | <0.0001 | No abnormality | No abnormality | 0.2 | <0.01 | ○ |
| Example 2 of the invention | <0.0005 | 0.52 (after correction) | 0.09 | <0.0001 | No abnormality | No abnormality | 0.3 | <0.01 | ○ |

TABLE 9-continued

|  | Leaching value (mg/l) | | | | | | Chromaticity (≦0.5) | Turbidity (≦0.2) | Leaching properties |
|---|---|---|---|---|---|---|---|---|---|
|  | Pb (≦0.001) | Zn (≦0.1) | Cu (≦0.1) | Cd (≦0.001) | Taste | Odor | | | |
| Example 3 of the invention | <0.0005 | 0.92 (after correction 0.0092) | 0.06 | <0.0001 | No abnormality | No abnormality | 0.5 | <0.01 | ○ |
| Example 4 of the invention | <0.0005 | 1.00 (after correction 0.0100) | 0.07 | <0.0001 | No abnormality | No abnormality | 0.2 | <0.01 | ○ |
| Example 5 of the invention | <0.0005 | 1.08 (after correction 0.0108) | 0.06 | <0.0001 | No abnormality | No abnormality | 0.4 | <0.01 | ○ |
| Example 6 of the invention | <0.0005 | 0.42 (after correction 0.0042) | 0.06 | <0.0001 | No abnormality | No abnormality | 0.3 | <0.01 | ○ |
| Example 7 of the invention | <0.0005 | 0.40 (after correction 0.0040) | 0.07 | <0.0001 | No abnormality | No abnormality | 0.4 | <0.01 | ○ |
| Example 8 of the invention | <0.0005 | 0.68 (after correction 0.0068) | 0.05 | <0.0001 | No abnormality | No abnormality | 0.5 | <0.01 | ○ |
| Example 9 of the invention | <0.0005 | 0.89 (after correction 0.0089) | 0.07 | <0.0001 | No abnormality | No abnormality | 0.2 | <0.01 | ○ |
| Example 10 of the invention | <0.0005 | 0.87 (after correction 0.0087) | 0.11 (after correction 0.0011) | <0.0001 | No abnormality | No abnormality | 0.5 | 0.02 | ○ |
| Example 11 of the invention | <0.0005 | 0.78 (after correction 0.0078) | 0.09 | <0.0001 | No abnormality | No abnormality | 0.5 | <0.01 | ○ |
| Example 12 of the invention | <0.0005 | 0.40 (after correction 0.0040) | 0.06 | <0.0001 | No abnormality | No abnormality | 0.4 | <0.01 | ○ |
| Example 13 of the invention | <0.0005 | 0.33 (after correction 0.0033) | 0.05 | <0.0001 | No abnormality | No abnormality | 0.2 | <0.01 | ○ |
| Example 14 of the invention | <0.0005 | 0.77 (after correction 0.0077) | 0.10 | <0.0001 | No abnormality | No abnormality | 0.4 | <0.01 | ○ |
| Example 15 of the invention | <0.0005 | 0.68 (after correction 0.0068) | 0.09 | <0.0001 | No abnormality | No abnormality | 0.3 | <0.01 | ○ |
| Example 16 of the invention | <0.0005 | 0.53 (after correction 0.0053) | 0.04 | <0.0001 | No abnormality | No abnormality | 0.4 | <0.01 | ○ |
| Example 17 of the invention | <0.0005 | 0.48 (after correction 0.0048) | 0.04 | <0.0001 | No abnormality | No abnormality | 0.3 | <0.01 | ○ |
| Example 18 of the invention | <0.0005 | 0.58 (after correction 0.0058) | 0.11 (after correction 0.0011) | <0.0001 | No abnormality | No abnormality | 0.5 | <0.01 | ○ |
| Example 19 of the invention | <0.0005 | 0.49 (after correction 0.0049) | 0.09 | <0.0001 | No abnormality | No abnormality | 0.4 | <0.01 | ○ |
| Example 20 of the invention | <0.0005 | 0.42 (after correction 0.0042) | 0.05 | <0.0001 | No abnormality | No abnormality | 0.2 | <0.01 | ○ |
| Example 21 of the invention | <0.0005 | 0.66 (after correction 0.0066) | 0.09 | <0.0001 | No abnormality | No abnormality | 0.5 | <0.01 | ○ |
| Example 22 of the invention | <0.0005 | 0.70 (after correction 0.0070) | 0.07 | <0.0001 | No abnormality | No abnormality | 0.5 | <0.01 | ○ |
| Example 23 of the invention | <0.0005 | 0.50 (after correction 0.0050) | 0.08 | <0.0001 | No abnormality | No abnormality | 0.5 | <0.01 | ○ |
| Example 24 of the invention | <0.0005 | 0.48 (after correction 0.0048) | 0.09 | <0.0001 | No abnormality | No abnormality | 0.4 | <0.01 | ○ |
| Example 25 of the invention | <0.0005 | 0.43 (after correction 0.0043) | 0.07 | <0.0001 | No abnormality | No abnormality | 0.5 | <0.01 | ○ |
| Example 26 of the invention | <0.0005 | 0.51 (after correction 0.0051) | 0.06 | <0.0001 | No abnormality | No abnormality | 0.4 | <0.01 | ○ |

TABLE 9-continued

| | Leaching value (mg/l) | | | | Taste | Odor | Chromaticity ($\leqq 0.5$) | Turbidity ($\leqq 0.2$) | Leaching properties |
| | Pb ($\leqq 0.001$) | Zn ($\leqq 0.1$) | Cu ($\leqq 0.1$) | Cd ($\leqq 0.001$) | | | | | |
|---|---|---|---|---|---|---|---|---|---|
| Example 27 of the invention | <0.0005 | 1.50 (after correction 0.0150) | 0.06 | <0.0001 | No abnormality | No abnormality | 0.5 | <0.01 | ○ |
| Example 28 of the invention | <0.0005 | 0.48 (after correction 0.0048) | 0.07 | <0.0001 | No abnormality | No abnormality | 0.4 | <0.01 | ○ |
| Example 29 of the invention | <0.0005 | 0.51 (after correction 0.0051) | 0.05 | <0.0001 | No abnormality | No abnormality | 0.4 | <0.01 | ○ |
| Example 30 of the invention | <0.0005 | 0.57 (after correction 0.0057) | 0.05 | <0.0001 | No abnormality | No abnormality | 0.3 | <0.01 | ○ |
| Example 31 of the invention | <0.0005 | 1.05 (after correction 0.0105) | 0.09 | <0.0001 | No abnormality | No abnormality | 0.5 | <0.01 | ○ |
| Example 32 of the invention | <0.0005 | 0.71 (after correction 0.0071) | 0.10 | <0.0001 | No abnormality | No abnormality | 0.3 | <0.01 | ○ |
| Example 33 of the invention | <0.0005 | 0.58 (after correction 0.0058) | 0.09 | <0.0001 | No abnormality | No abnormality | 0.4 | <0.01 | ○ |
| Example 34 of the invention | <0.0005 | 0.54 (after correction 0.0054) | 0.06 | <0.0001 | No abnormality | No abnormality | 0.3 | <0.01 | ○ |
| Example 35 of the invention | <0.0005 | 0.56 (after correction 0.0056) | 0.07 | <0.0001 | No abnormality | No abnormality | 0.3 | <0.01 | ○ |
| Example 36 of the invention | <0.0005 | 0.52 (after correction 0.0052) | 0.07 | <0.0001 | No abnormality | No abnormality | 0.4 | <0.01 | ○ |
| Example 37 of the invention | <0.0005 | 0.59 (after correction 0.0059) | 0.05 | <0.0001 | No abnormality | No abnormality | 0.4 | <0.01 | ○ |
| Example 38 of the invention | <0.0005 | 0.45 (after correction 0.0045) | 0.05 | <0.0001 | No abnormality | No abnormality | 0.4 | <0.01 | ○ |
| Example 39 of the invention | 0.029 (after correction 0.00029) | 0.62 (after correction 0.0062) | 0.08 | <0.0001 | No abnormality | No abnormality | 0.5 | 0.06 | Δ |
| Comparative Example 1 | 0.38 (after correction 0.0038) | 0.31 (after correction 0.0031) | 0.08 | 0.0004 | No abnormality | No abnormality | 0.5 | 0.08 | Reference material X |
| Comparative Example 2 | <0.0005 | 0.23 (after correction 0.0023) | 0.15 (after correction 0.0015) | <0.0001 | No abnormality | No abnormality | 0.5 | <0.01 | ○ |
| Comparative Example 3 | <0.0005 | 0.32 (after correction 0.0032) | 0.10 (after correction 0.0010) | <0.0001 | No abnormality | No abnormality | 0.5 | <0.01 | ○ |
| Comparative Example 4 | <0.0005 | 1.22 (after correction 0.0122) | 0.05 | <0.0001 | No abnormality | No abnormality | 0.5 | <0.01 | ○ |
| Comparative Example 5 | <0.0005 | 1.12 (after correction 0.0112) | 0.18 (after correction 0.0018) | <0.0001 | No abnormality | No abnormality | 0.6 | 0.05 | X |
| Comparative Example 6 | <0.0005 | 1.00 (after correction 0.0100) | 0.13 (after correction 0.0013) | <0.0001 | No abnormality | No abnormality | 0.6 | 0.02 | X |
| Comparative Example 7 | <0.0005 | 0.40 (after correction 0.0040) | 0.11 (after correction 0.0011) | <0.0001 | No abnormality | No abnormality | 0.7 | 0.07 | X |
| Comparative Example 8 | <0.0005 | 1.20 (after correction 0.0120) | 0.12 (after correction 0.0012) | <0.0001 | No abnormality | No abnormality | 0.7 | 0.06 | X |
| Comparative Example 9 | <0.0005 | 0.98 (after correction 0.0098) | 0.09 | <0.0001 | No abnormality | No abnormality | 0.5 | <0.01 | ○ |
| Comparative Example 10 | <0.0005 | 0.38 (after correction 0.0038) | 0.03 | <0.0001 | No abnormality | No abnormality | 0.4 | <0.01 | ○ |
| Comparative Example 11 | <0.0005 | 0.82 (after correction 0.0082) | 0.12 (after correction 0.0012) | <0.0001 | No abnormality | No abnormality | 0.4 | <0.01 | ○ |

TABLE 9-continued

| | Leaching value (mg/l) | | | | | | | | |
|---|---|---|---|---|---|---|---|---|---|
| | Pb ($\leqq$0.001) | Zn ($\leqq$0.1) | Cu ($\leqq$0.1) | Cd ($\leqq$0.001) | Taste | Odor | Chromaticity ($\leqq$0.5) | Turbidity ($\leqq$0.2) | Leaching properties |
| Comparative Example 12 | <0.0005 | 0.72 (after correction 0.0072) | 0.04 | <0.0001 | No abnormality | No abnormality | 0.4 | <0.01 | ◯ |
| Comparative Example 13 | <0.0005 | 1.18 (after correction 0.0118) | 0.16 (after correction 0.0016) | <0.0001 | No abnormality | No abnormality | 0.7 | 0.07 | X |
| Comparative Example 14 | <0.0005 | 0.82 (after correction 0.0082) | 0.12 (after correction 0.0012) | <0.0001 | No abnormality | No abnormality | 0.6 | <0.01 | X |
| Comparative Example 15 | <0.0005 | 0.98 (after correction 0.0098) | 0.11 (after correction 0.0011) | <0.0001 | No abnormality | No abnormality | 0.5 | <0.01 | ◯ |
| Comparative Example 16 | <0.0005 | 0.85 (after correction 0.0085) | 0.14 (after correction 0.0014) | <0.0001 | No abnormality | No abnormality | 0.5 | <0.01 | ◯ |
| Comparative Example 17 | <0.0005 | 1.12 (after correction 0.0112) | 0.13 (after correction 0.0013) | <0.0001 | No abnormality | No abnormality | 0.5 | 0.05 | ◯ |
| Comparative Example 18 | <0.0005 | 1.01 (after correction 0.0101) | 0.13 (after correction 0.0013) | <0.0001 | No abnormality | No abnormality | 0.4 | 0.03 | ◯ |
| Comparative Example 19 | <0.0005 | 0.48 (after correction 0.0048) | 0.12 (after correction 0.0012) | <0.0001 | No abnormality | No abnormality | 0.2 | <0.01 | ◯ |
| Comparative Example 20 | 0.061 (after correction 0.00061) | 0.55 (after correction 0.0055) | 0.09 | <0.0001 | No abnormality | No abnormality | 0.5 | 0.05 | Δ |

<Test for Machinability>

Using a cemented carbide tool, the respective copper alloy specimens were lathed at a cutting speed of 400 (m/min), with a depth of cut of 1.0 mm and a feed rate of 0.1 mm/rev., and the influence of cutting on each specimen was determined according to the machinability coefficient, surface roughness and the shapes of powder chips. These results are shown in the respective tables. As an alloy that shows ideal machinability, the alloy of Comparative Example 1 (CAC406) was also evaluated for surface roughness and the shapes of powder chips. The results are shown in Table 10 as well as in Tables 1 to 6. For Example 27 of the invention and Comparative Example 1, measurements were made for two different cutting speeds of 100 (m/min) and 200 (m/min). But no significant differences were observed according to a difference in cutting speed.

TABLE 10

| | Machining speed (m/min) | Machinability coefficient $\geqq$70 | Surface roughness (μm) | Shape of chips | Evaluation of Machinability |
|---|---|---|---|---|---|
| Example 1 of the invention | 400 | 77.9 | 0.8 | ◯ | ◯ |
| Example 2 of the invention | 400 | 72.7 | 0.8 | ◯ | ◯ |
| Example 4 of the invention | 400 | 80.8 | 0.9 | ◯ | ◯ |
| Example 5 of the invention | 400 | 81.3 | 1.0 | ◯ | ◯ |
| Example 6 of the invention | 400 | 75.2 | 0.9 | ◯ | ◯ |
| Example 7 of the invention | 400 | 76.7 | 0.9 | ◯ | ◯ |
| Example 9 of the invention | 400 | 79.1 | 1.1 | ◯ | ◯ |
| Example 10 of the invention | 400 | 83.1 | 0.8 | ◯ | ◯ |
| Example 11 of the invention | 400 | 81.6 | 0.8 | ◯ | ◯ |
| Example 12 of the invention | 400 | 73.1 | 1.0 | ◯ | ◯ |
| Example 13 of the invention | 400 | 74.9 | 1.0 | ◯ | ◯ |
| Example 14 of the invention | 400 | 83.1 | 0.9 | ◯ | ◯ |
| Example 15 of the invention | 400 | 75.7 | 0.9 | ◯ | ◯ |

TABLE 10-continued

|  | Machining speed (m/min) | Machinability coefficient ≧70 | Surface roughness (μm) | Shape of chips | Evaluation of Machinability |
|---|---|---|---|---|---|
| Example 16 of the invention | 400 | 71.8 | 0.9 | ○ | ○ |
| Example 17 of the invention | 400 | 75.3 | 0.9 | ○ | ○ |
| Example 18 of the invention | 400 | 82.5 | 0.9 | ○ | ○ |
| Example 19 of the invention | 400 | 80.8 | 1.0 | ○ | ○ |
| Example 20 of the invention | 400 | 80.9 | 0.8 | ○ | ○ |
| Example 21 of the invention | 400 | 85.9 | 0.8 | ○ | ○ |
| Example 23 of the invention | 400 | 84.2 | 1.0 | ○ | ○ |
| Example 24 of the invention | 400 | 91.3 | 0.9 | ○ | ○ |
| Example 25 of the invention | 400 | 86.7 | 0.9 | ○ | ○ |
| Example 26 of the invention | 400 | 90.2 | 1.0 | ○ | ○ |
| Example 27 of the invention | 400 | 72.7 | 0.7 | ○ | ○ |
| Example 27 of the invention | 200 | 73.2 | 0.6 | ○ | ○ |
| Example 27 of the invention | 100 | 74.5 | 0.8 | ○ | ○ |
| Example 28 of the invention | 400 | 80.2 | 0.9 | ○ | ○ |
| Example 29 of the invention | 400 | 79.2 | 0.9 | ○ | ○ |
| Example 30 of the invention | 400 | 79.7 | 0.7 | ○ | ○ |
| Example 31 of the invention | 400 | 75.7 | 0.8 | ○ | ○ |
| Example 32 of the invention | 400 | 80.0 | 1.0 | ○ | ○ |
| Example 33 of the invention | 400 | 79.9 | 0.8 | ○ | ○ |
| Example 34 of the invention | 400 | 79.1 | 0.9 | ○ | ○ |
| Example 35 of the invention | 400 | 75.2 | 0.8 | ○ | ○ |
| Example 36 of the invention | 400 | 76.4 | 0.9 | ○ | ○ |
| Example 37 of the invention | 400 | 80.4 | 0.9 | ○ | ○ |
| Example 38 of the invention | 400 | 80.2 | 0.9 | ○ | ○ |
| Example 39 of the invention | 400 | 75.9 | 0.9 | ○ | ○ |
| Comparative Example 1 | 400 | 100.0 | 0.8 | Reference | Reference |
| Comparative Example 1 | 200 | 100.0 | 0.8 | Reference | Reference |
| Comparative Example 1 | 100 | 100.0 | 1.0 | Reference | Reference |
| Comparative Example 2 | 400 | 71.2 | 0.8 | ○ | ○ |
| Comparative Example 3 | 400 | 73.5 | 0.9 | ○ | ○ |
| Comparative Example 4 | 400 | 78.5 | 0.9 | ○ | ○ |
| Comparative Example 6 | 400 | 86.4 | 0.9 | ○ | ○ |
| Comparative Example 7 | 400 | 80.2 | 0.9 | ○ | ○ |
| Comparative Example 9 | 400 | 85.2 | 1.0 | ○ | ○ |
| Comparative Example 10 | 400 | 66.6 | 0.9 | ○ | X |
| Comparative Example 11 | 400 | 85.8 | 1.0 | ○ | ○ |
| Comparative Example 12 | 400 | 80.0 | 0.8 | ○ | ○ |

TABLE 10-continued

|  | Machining speed (m/min) | Machinability coefficient ≧70 | Surface roughness (μm) | Shape of chips | Evaluation of Machinability |
|---|---|---|---|---|---|
| Comparative Example 13 | 400 | 61.1 | 1.0 | X | X |
| Comparative Example 14 | 400 | 86.1 | 0.8 | ○ | ○ |
| Comparative Example 15 | 400 | 61.8 | 0.9 | X | X |
| Comparative Example 16 | 400 | 96.9 | 0.9 | ○ | ○ |
| Comparative Example 17 | 400 | 77.6 | 0.9 | ○ | ○ |
| Comparative Example 18 | 400 | 75.9 | 0.9 | ○ | ○ |
| Comparative Example 19 | 400 | 79.3 | 0.8 | ○ | ○ |

The machinability coefficients were calculated from three stresses (resultant of three stresses) of the respective examples and three stresses (resultant of three forces) of CAC406 as a comparative material as measured by AST-TTH made by Sato Kogyo Co., Ltd. as a type AST cutting tool dynamometer, using the abovementioned equations (1) and (2). Specimens of which the machinability coefficient is 70 or higher were determined to be good. For Comparative Examples 10, 13 and 15, the machinability coefficients were less than 70. The cutting resistance was so large that it was necessary to reduce the cutting speed. Productivity is thus low.

The surface roughness was measured using a surface roughness meter (made by Mitsutoyo Corporation: Surftest-4), and the respective surface roughness values were compared with the surface roughness of the comparative material CAC406 (Comparative Example 1). At any cutting speed, the surface roughness values of the copper alloy specimens of examples of the invention were larger only by 0.3 μm at the most than the surface roughness value of the comparative material, so that their finish was equivalent to that of the comparative material. These results are shown in the respective tables.

The powder chips were evaluated according to their shapes by classifying their shaped as shown in FIG. 5. The shapes of powder chips produced from the respective examples are shown in FIGS. 6(a) to 6(e). The symbols "○" and "X" are given to examples of which the shapes of chips are good and no good, respectively. Examples 7 and 21 of the invention, of which the bismuth contents are 0.6% by weight and 1.0% by weight, respectively, both produced broken chips. Examples 25 and 23 of the invention, of which the bismuth contents are 1.6% by weight and 1.7% by weight, respectively, produced broken chips at high cutting speeds. Example 26 of the invention, of which the bismuth content is 3.3% by weight, produced ideal sheared chips. The higher the bismuth content, the more ideal the shapes of chips become. But Example 23 of the invention, of which the bismuth content is higher by 0.1% by weight than Example 25, produced broken chips. On the other hand, Example 25 produced ideal sheared chips in spite of the fact that its bismuth content is lower by 0.1% by weight than Example 23. This indicates that Example 25, of which the tin content is twice that of Example 23, produces larger amounts of nickel-tin compounds, which serve as chip breakers in the same manner as bismuth. On the other hand, Comparative Examples 13 and 15 produced long helical chips. Such chips tend to increasing the temperature of the cutting tool, thereby shortening the lifespan of the tool. The added values in Example 27 of the invention and Comparative Example 1 indicate cutting speed (m/min). For all the other examples, the cutting speed was 40 (m/min).

(Consideration about the Zinc Content)

As shown in Table 1, copper alloy specimens were prepared of which the zinc contents are significantly different from each other with the contents of other elements as close to each other as possible. The above measurements were made for these specimens. Comparative Example 2 and Examples 1 to 5 of the invention contained about 2.5% by weight of tin, while Comparative Examples 3 and 4 and Examples 6 to 9 of the invention contained about 5.0% by weight of tin. In either case, for Comparative Examples 2 and 3, of which the zinc contents are less than 5% by weight, evaluations of flowability of molten metal and liquid penetrant testing were both "X". In the table, the contents of the respective elements are in weight percent, the tensile strength is in (MPa), and the elongation is in (%).

(Consideration about the Nickel Content)

As shown in Table 2, copper alloy specimens Were prepared of which the nickel contents are significantly different from each other with the contents of other elements as close to each other as possible. The above measurements were made for these specimens. Comparative Examples 5 to 7 and Examples 2 and 10 to 13 of the invention contained about 2.5% by weight of tin, while Comparative Examples 8 to 10 and Examples 7 and 14 to 17 of the invention contained about 5.0% by weight of tin. Comparative Examples 5, 6, 8 and 9, of which the nickel contents are less than 1.5% by weight, developed microporosity and the like, irrespective of the tin contents. Comparative Examples 5 and 8, of which the nickel contents are low, caused problems in the leaching test too. On the other hand, Comparative Examples 7 and 10, of which the nickel contents are higher than 5.0% by weight, the elongation was too low. Comparative Example 10, which contained a large amount of tin, was inferior in machinability.

(Consideration about the Tin Content)

As shown in Table 3, copper alloy specimens were prepared of which the tin contents are significantly different from each other with the contents of other elements as close to each other as possible. The above measurements were made for these specimens. Comparative Example 11, of which the tin content was less than 2.0% by weight, developed microporosity and the like. On the other hand, Comparative Example 12, of which the tin content is higher than 5.9% by weight, was too low in the elongation.

(Consideration about the Bismuth Content)

As shown in Table 4, copper alloy specimens were prepared of which the bismuth contents are significantly different from each other with the contents of other elements as close to each other as possible. The above measurements were made for these specimens. Comparative Examples 13 and 14 and Examples 2 and 21 to 24 of the invention contained about 2.5% by weight of tin, while Comparative Examples 15 and 16 and Examples 7, 25 and 26 of the invention contained about 5.0% by weight of tin. Comparative Examples 13 and 15, of which the bismuth contents are less than 0.4% by weight, caused problems in machinability. Comparative Example 13 developed microporosity. Comparative Example 15 caused problems in flowability of molten metal. On the other hand, while Example 26, which contained about 5% by weight of tin, showed favorable properties even though the bismuth content is 3.3% by weight, Comparative Example 14, which contained 2.4% by weight of tin, caused problems in flowability of molten metal and mechanical properties when the bismuth content was 2.4% by weight. This indicates that the permissible bismuth content varies with the tin content.

(Consideration about the Phosphorus Content)

As shown in Table 5, copper alloy specimens were prepared of which the phosphorus contents are significantly different from each other with the contents of other elements as close to each other as possible. The above measurements were made for these specimens. Comparative Example 17 and Examples 2 and 27 to 30 of the invention contained about 2.5% by weight of tin, while Examples 31 to 36 of the invention contained about 3.5% by weight of tin, and Comparative Examples 18 and 19 and Examples 7, 37 and 38 of the invention contained about 5.0% by weight of tin. Comparative Examples 17 and 18, of which the phosphorus contents are less than 0.009% by weight, developed microporosity. On the other hand, Comparative Example 19, of which the phosphorus content is higher than 0.15% by weight, was too low in the elongation, so that it had a problem in mechanical properties. For comparison, the values in Table 5 are those when the cutting speed was 400 m/min.

(Consideration of Large Amounts of Impurities)

As shown in Table 6, copper alloys containing 0.2% by weight of lead (Example 39 of the invention) and containing 0.5% by weight of lead (Comparative Example 20) were prepared, and the above measurements were made. Example 38 satisfied every standard. But in Comparative Example 20, microporosity and the like deteriorated to an unignorable level.

As shown in Table 6, copper alloys containing silicon by amounts higher than the detection limit, i.e. 0.02% by weight and 0.25% by weight (Comparative Examples 21 to 23) were prepared, and the above measurements were made. Comparative Example 21, of which the silicon content is 0.02% by weight, was inferior in flowability of molten metal, while Comparative Examples 22 and 23, of which the silicon contents are 0.25% by weight, developed microporosity and the like.

(Metallographic Analysis Using EPMA)

For the alloys of selected examples, metallographic analysis in the form of mapping analysis of the respective elements was carried out using EPMA-8705 made by Shimadzu Corporation to confirm the distributions of the respective elements and the formation of compounds. The elements examined were copper, nickel, tin, zinc, phosphorus and bismuth. Their distributions and the form of compounds were examined.

Among these examples, examination was selectively made for the examples used for consideration about nickel, tin, bismuth and phosphorus. FIGS. 7(a) to 7(i) show the results of 360-times mapping analysis thereof. Comparison of these element contents reveals that by adding nickel, nickel-tin compounds and nickel-phosphorus compounds form. The surface rate of nickel compound and bismuth, which are considered to be involved in the amount of microporosity, was measured using GRADING ANALYSIS made by Keyence Corporation.

Specifically, the results of analysis by EPMA-8705 were formed into images using data processing software H5 that is attached to this device. Using this software, nickel and phosphorus, nickel and tin, and bismuth element were individually synthesized and images were formed for the overlapping portions by digital data. Based on these data, analysis was made by the abovementioned GRADING ANALYSIS. The results of analysis and measurement are shown in Table 11.

TABLE 11

| | Contents of elements considered (weight %) | Bi area rate (%) | Ni—P area rate (%) | Ni—Sn area rate (%) | Total area rate of Ni compounds (%) | Total area rate of Bi + Ni compounds (%) |
|---|---|---|---|---|---|---|
| Nickel range | | | | | | |
| Example 10 of the invention | 1.5 | 0.68 | 0.02 | 0.02 | 0.04 | 0.72 |
| Example 2 of the invention | 2.5 | 0.71 | 0.07 | 0.06 | 0.13 | 0.85 |
| Example 13 of the invention | 5.0 | 1.36 | 0.31 | 0.78 | 1.10 | 2.46 |
| Example 14 of the invention | 1.5 | 0.76 | 0.03 | 0.24 | 0.27 | 1.03 |
| Example 17 of the invention | 5.0 | 0.37 | 0.32 | 0.59 | 0.92 | 1.28 |
| Tin range | | | | | | |
| Example 18 of the invention | 2.0 | 0.62 | 0.11 | 0.03 | 0.13 | 0.76 |

TABLE 11-continued

|  | Contents of elements considered (weight %) | Bi area rate (%) | Ni—P area rate (%) | Ni—Sn area rate (%) | Total area rate of Ni compounds (%) | Total area rate of Bi + Ni compounds (%) |
| --- | --- | --- | --- | --- | --- | --- |
| Example 2 of the invention | 2.7 | 0.71 | 0.07 | 0.06 | 0.13 | 0.85 |
| Example 19 of the invention | 3.9 | 0.65 | 0.08 | 0.09 | 0.17 | 0.82 |
| Example 7 of the invention | 5.2 | 0.94 | 0.08 | 0.35 | 0.44 | 1.38 |
| Example 20 of the invention Bismuth range | 5.9 | 1.22 | 0.21 | 1.74 | 1.95 | 3.17 |
| Example 2 of the invention | 0.6 | 0.71 | 0.07 | 0.06 | 0.13 | 0.85 |
| Example 23 of the invention | 1.7 | 2.15 | 0.06 | 0.17 | 0.23 | 2.37 |
| Example 24 of the invention | 2.0 | 2.19 | 0.02 | 0.11 | 0.14 | 2.33 |
| Example 7 of the invention | 0.6 | 0.94 | 0.08 | 0.35 | 0.44 | 1.38 |
| Example 26 of the invention Phosphorus range | 3.3 | 4.55 | 0.11 | 1.29 | 1.40 | 5.95 |
| Example 2 of the invention | 0.017 | 0.71 | 0.07 | 0.06 | 0.13 | 0.85 |
| Example 27 of the invention | 0.039 | 0.53 | 0.19 | 0.19 | 0.39 | 0.91 |
| Example 30 of the invention | 0.150 | 0.38 | 0.42 | 0.00 | 0.42 | 0.80 |

In the consideration according to the nickel, tin and phosphorus contents, the area ratios of nickel-tin compounds and nickel-phosphorus compounds increased with increases in the contents of the elements considered. In order to consider these compounds in more detail, for Examples 13, 23 and 26 of the invention, further enlarged 2000-fold mapping analysis was carried out. As a result, it was discovered that nickel, tin and phosphorus compounds deposited near bismuth. This shows that they serve to fill microporosity.

What is claimed is:

1. A copper alloy member for use in water works consisting essentially of not less than 2.0% by weight and not more than 5.9% by weight of tin, not less than 1.5% by weight and not more than 5.0% by weight of nickel, not less than 5.0% by weight and not more than 12.1% by weight of zinc, not less than 0.4% by weight and not more than 3.3% by weight of bismuth, and not less than 0.009% by weight and not more than 0.15% by weight of phosphorus, the balance being copper and impurities.

2. The copper alloy member for use in water works according to claim 1, wherein said impurities include lead of which the content is not more than 0.2% by weight, and silicon of which the content is less than 0.01% by weight.

3. The copper alloy member for use in water works according to claim 1, wherein the content of said bismuth is not less than 0.4% by weight and not more than 2.0% by weight.

4. The copper alloy member for use in water works according to claim 1, wherein the content of said tin is not less than 5.1% by weight and not more than 5.2% by weight.

5. The copper alloy member for use in water works according to claim 2, wherein the content of said bismuth is not less than 0.4% by weight and not more than 2.0% by weight.

6. The copper alloy member for use in water works according to claim 2, wherein the content of said tin is not less than 5.1% by weight and not more than 5.2% by weight.

* * * * *